US010195977B2

(12) United States Patent
Bettcher, III et al.

(10) Patent No.: US 10,195,977 B2
(45) Date of Patent: Feb. 5, 2019

(54) PARALLELOGRAM ARM VEHICLE LIFT

(71) Applicant: The Braun Corporation, Winamac, IN (US)

(72) Inventors: Robert E. Bettcher, III, Winamac, IN (US); Justin M. Kline, Westfield, IN (US); Austin D. Metzger, Rensselaer, IN (US); Haiyan Henry Zhang, West Lafayette, IN (US); Cong Liao, West Lafayette, IN (US); Achilleas Bardakas, West Lafayette, IN (US)

(73) Assignee: The Braun Corporation, Winamac, IN (US)

( * ) Notice: Subject to any disclaimer, the term of this patent is extended or adjusted under 35 U.S.C. 154(b) by 0 days.

(21) Appl. No.: 15/608,077

(22) Filed: May 30, 2017

(65) Prior Publication Data

US 2018/0126889 A1    May 10, 2018

Related U.S. Application Data

(60) Provisional application No. 62/342,478, filed on May 27, 2016.

(51) Int. Cl.
*B60P 1/44* (2006.01)
*A61G 3/06* (2006.01)

(52) U.S. Cl.
CPC ............ *B60P 1/4407* (2013.01); *A61G 3/062* (2013.01); *B60P 1/44* (2013.01); *B60P 1/4457* (2013.01); *A61G 3/061* (2013.01)

(58) Field of Classification Search
CPC ..... B60P 1/4407; B60P 1/4414; B60P 1/4421; B60P 1/4457; A61G 3/062
See application file for complete search history.

(56) References Cited

U.S. PATENT DOCUMENTS

| 4,415,202 | A | 11/1983 | Pew |
| D310,747 | S | 9/1990 | Isogai |
| 6,065,924 | A | 5/2000 | Budd et al. |
| 6,203,266 | B1 | 3/2001 | Savaria et al. |
| 7,290,975 | B2 | 11/2007 | Thurman et al. |
| 7,422,408 | B2 | 9/2008 | Sobota et al. |
| 7,441,995 | B2 * | 10/2008 | Sobota ............... A61G 3/06 410/7 |
| 7,509,187 | B2 * | 3/2009 | Hayes ............... A61G 3/06 187/200 |

(Continued)

OTHER PUBLICATIONS

International Search Report and Written Opinion; dated May 30, 2017; 18 pages.

*Primary Examiner* — Kaitlin S Joerger
(74) *Attorney, Agent, or Firm* — Ryan O. White; Taft Stettinius & Hollister LLP

(57) ABSTRACT

A lift for transferring a user to and from a vehicle, the lift including a lift platform for receiving the user, the lift platform being arcuately movable between a first position and a second position; a vertical arm coupled to the lift platform, the vertical arm having a profile that is progressively convex along the entire length of the vertical arm; and a pair of parallel arms extending from the vertical arm, wherein each of the parallel arms is pivotally coupled to a bracket mounted to the vehicle; wherein the vertical arm has a generally U-shaped cross-section that forms a channel configured to receive at least a portion of the pair of parallel arms.

23 Claims, 25 Drawing Sheets

(56) References Cited

U.S. PATENT DOCUMENTS

| | | | |
|---|---|---|---|
| 7,798,761 B2* | 9/2010 | Goodrich | A61G 3/061 |
| | | | 318/468 |
| D708,412 S | 7/2014 | Bruns | |
| 9,375,369 B2* | 6/2016 | Bruns | A61G 3/062 |
| 9,814,635 B2* | 11/2017 | Bruns | A61G 3/062 |
| 2005/0238471 A1* | 10/2005 | Ablabutyan | A61G 3/06 |
| | | | 414/546 |
| 2006/0104775 A1* | 5/2006 | Kasten, Jr. | B60P 1/4457 |
| | | | 414/546 |
| 2006/0233632 A1* | 10/2006 | Hayes | A61G 3/06 |
| | | | 414/546 |
| 2007/0217898 A1 | 9/2007 | Goodrich | |
| 2007/0224025 A1* | 9/2007 | Ablabutyan | B60P 1/4442 |
| | | | 414/546 |
| 2009/0010744 A1* | 1/2009 | Sobota | A61G 3/06 |
| | | | 414/546 |
| 2009/0272953 A1 | 11/2009 | Wolf | |
| 2010/0028115 A1* | 2/2010 | Ablabutyan | B60P 1/4442 |
| | | | 414/539 |
| 2011/0008141 A1* | 1/2011 | Goodrich | A61G 3/061 |
| | | | 414/539 |
| 2013/0251488 A1 | 9/2013 | Bruns | |
| 2014/0105711 A1 | 4/2014 | Gallingani et al. | |
| 2014/0377047 A1 | 12/2014 | Gallingani | |
| 2015/0076431 A1 | 3/2015 | Kritzer | |

\* cited by examiner

PARALLELOGRAM ARM VEHICLE LIFT

CROSS-REFERENCE TO RELATED APPLICATIONS

This application claims the benefit of U.S. Provisional Patent Application Ser. No. 62/342,478, filed May 27, 2016, the complete disclosure of which is hereby expressly incorporated in its entirety herein by this reference.

TECHNICAL FIELD

The present teachings are generally related to a vehicle lift, and more particularly to a parallelogram-type vehicle lift for assisting disabled persons, including those in wheelchairs, enter and exit a motorized passenger vehicle.

BACKGROUND OF THE INVENTION

The statements in this section merely provide background information related to the present disclosure and should not be construed as constituting prior art.

Vehicles adapted for mobility-challenged individuals are necessary in order to provide these individuals with the ability to reach locations requiring vehicular travel. These vehicles often have electrical or hydraulic powered wheelchair lifts for assisting wheelchair occupants both enter and exit the vehicle. Parallelogram-type wheelchair lifts are offered by a number of manufacturers, including the L900 series of lifts from The Braun Corporation of Winamac, Ind. (see, for instance, U.S. Pat. No. 5,261,779—the disclosure of which is incorporated in its entirety herein by this reference). These lifts employ various mechanisms to cause the platform to move arcuately upward from the horizontal transfer level to a vertical or over-vertical stowage position.

One system involves the use of an articulated lever assembly comprising a pair of arms of unequal length pivotably connected to each other at one end, and pivotably connected at their other respective ends to a vertical lift arm end link (the bottom end of which is pivotally secured to the platform) and an inboard end of the platform. As the hydraulic ram of the lifting assembly is actuated, thereby lifting the platform from the ground level toward the transfer level, a sliding block, which is pivotally secured at the common center of the two arms, comes into contact with the lower arm of the parallelogram. As the lifting continues, and the end link approaches the lower arm, the lower (longer) arm of the lever assembly is pushed downwardly. In turn, this causes the outboard end of platform to rotate upwardly to the stowed position.

Since parallelogram-style lifts must be able to stop at various positions throughout their lifting cycle, it is important that their operation be smooth and efficient and with minimal unwanted drift, jerkiness and/or misalignment problems. The present teachings are intended to improve upon and resolve some of these known deficiencies of the art.

SUMMARY OF THE INVENTION

In accordance with one embodiment, a lift for transferring a user to and from a vehicle is provided including a lift platform for receiving the user, the lift platform being arcuately movable between a first position and a second position; a vertical arm coupled to the lift platform, the vertical arm having a profile that is progressively convex along the entire length of the vertical arm; and a pair of parallel arms extending from the vertical arm, wherein each of the parallel arms is pivotally coupled to a bracket mounted to the vehicle. In accordance with this embodiment, the vertical arm has a generally U-shaped cross-section that forms a channel configured to receive at least a portion of the pair of parallel arms.

In accordance with certain embodiments herein, the lift further comprises a barrier connected to the lift platform, wherein the barrier is configured to pivotally move in coordination with the lift platform as the lift platform moves between the first and second positions.

According to other embodiments, the lift further comprises a linkage mechanism configured to actuate the lift platform and the barrier.

In accordance with certain aspects herein, the linkage mechanism comprises a pivoting elbow member that is configured to at least partially contact an outer surface of one of the pair of parallel arms as the lift platform moves between the first and second positions.

According to still further embodiments of the present invention, the lift platform further comprises a second barrier that is pivotally connected to the lift platform, wherein the second barrier is parallel to the first barrier.

In accordance with certain aspects herein, one of the pair of parallel arms has a U-shaped cross-section, while in accordance with yet other aspects, the other one of the pair of parallel arms has a square-shaped cross-section.

In accordance with still other embodiments, the lift platform further includes a pair of parallel side plates. According to certain embodiments, at least one of the pair of parallel side plates includes a light source that is configured to illuminate a portion of the lift platform.

According to certain aspects herein, the lift further comprises a switch for actuating the lift platform between the first and second positions.

In accordance with other aspects of the present invention, the lift further comprises a control assembly in communication with the switch, wherein the control assembly is configured to move the lift platform between the first and second positions in response to a user activating the switch.

In accordance with yet another embodiment of the present invention, the lift further comprises a foldable handrail that extends through an opening of the vertical arm.

In accordance with still other embodiments herein, the lift further comprises a hydraulic cylinder diagonally disposed between the pair of parallel arms.

According to another illustrative embodiment of the present invention, a lift for transferring a user to and from a vehicle comprises a lift platform for receiving the user, and a pair of lifting assemblies configured to arcuately move the lift platform between a first position and a second position, wherein the lifting assemblies each have a first arm coupled to the lift platform and a pair of parallel arms pivotally connected to the first arm. In accordance with this embodiment, the first arm has a profile that is progressively convex along its entire length and a generally U-shaped cross-section that forms a channel configured to receive at least a portion of the pair of parallel arms.

Other objects and benefits of the disclosure will become apparent from the following written description along with the accompanying drawings.

BRIEF DESCRIPTION OF THE DRAWINGS

The above-mentioned aspects of the present teachings and the manner of obtaining them will become more apparent and the teachings themselves will be better understood by reference to the following description of the illustrative embodiments taken in conjunction with the accompanying drawings. The accompanying drawings, which are incorporated in and constitute a part of this specification, illustrate embodiments of the invention and, together with a general description of the invention given above, and the detailed description of the embodiments given below, serve to explain the principles of the invention.

Figure 1:
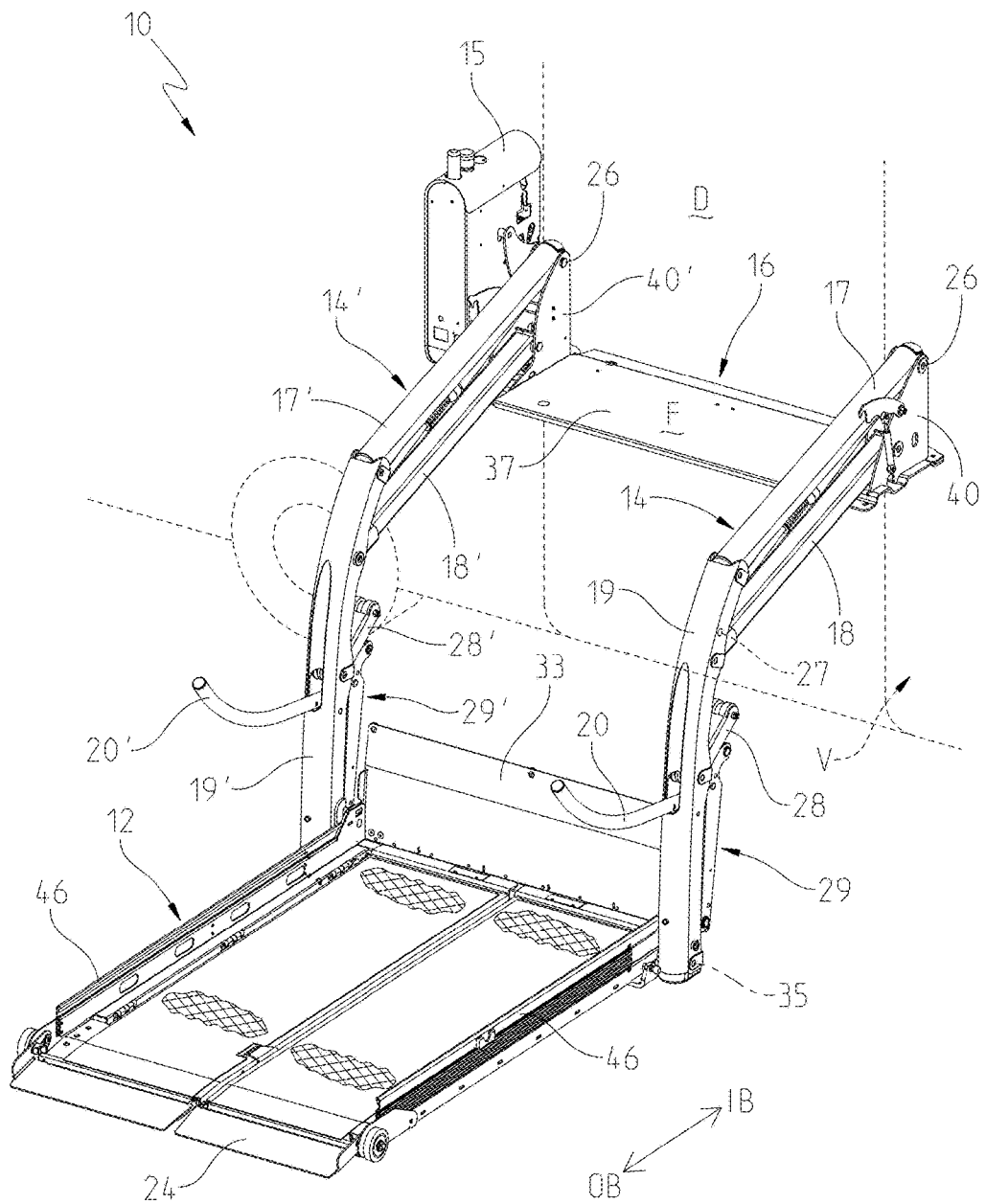
FIG. 1 represents a perspective view of an illustrative vehicle lift assembly in a ground level and loading position in accordance with one embodiment of the present teachings.
Figure 2:
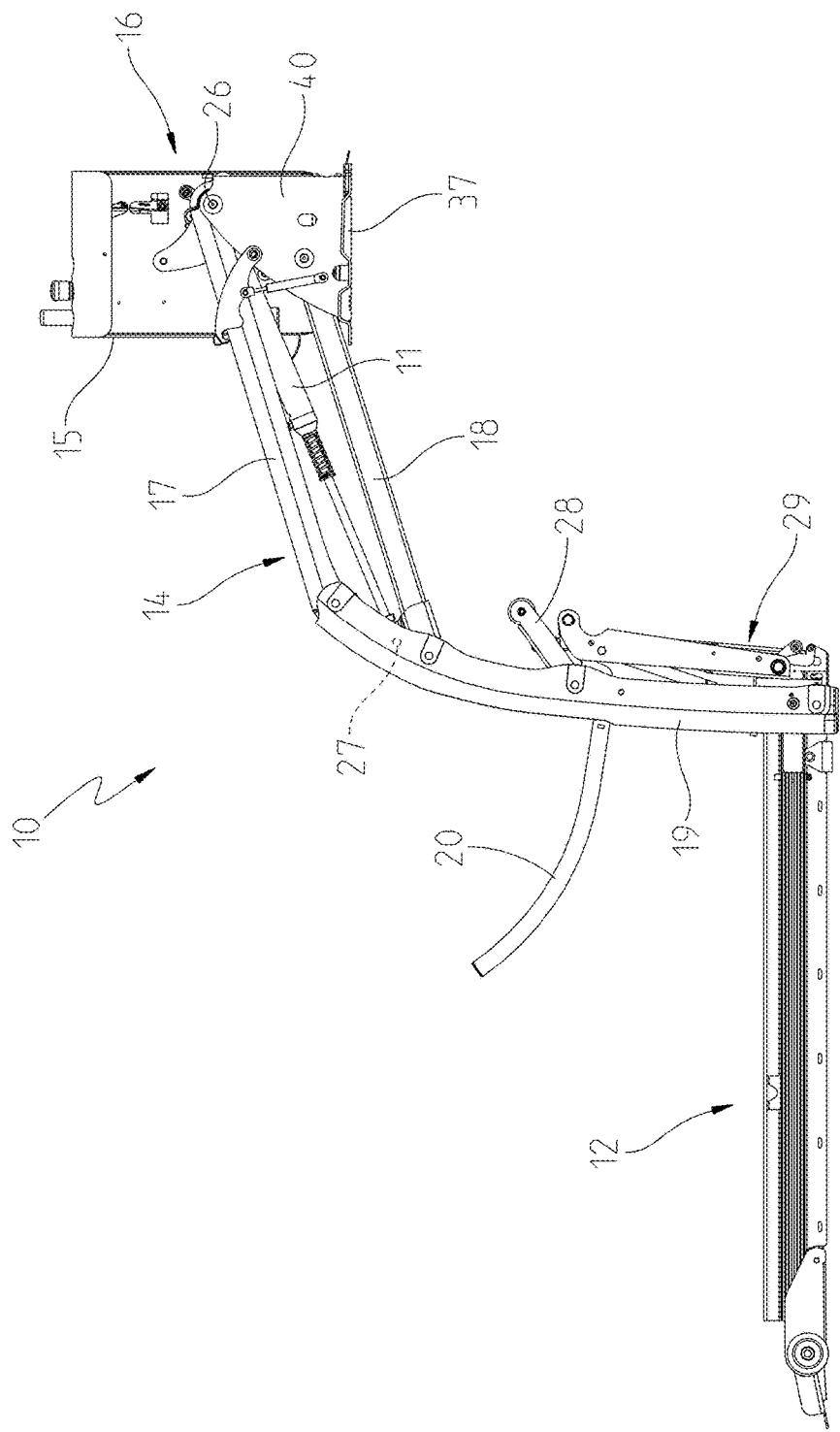
FIG. 2 represents a side view of the illustrative vehicle lift assembly of FIG. 1.
Figure 3:
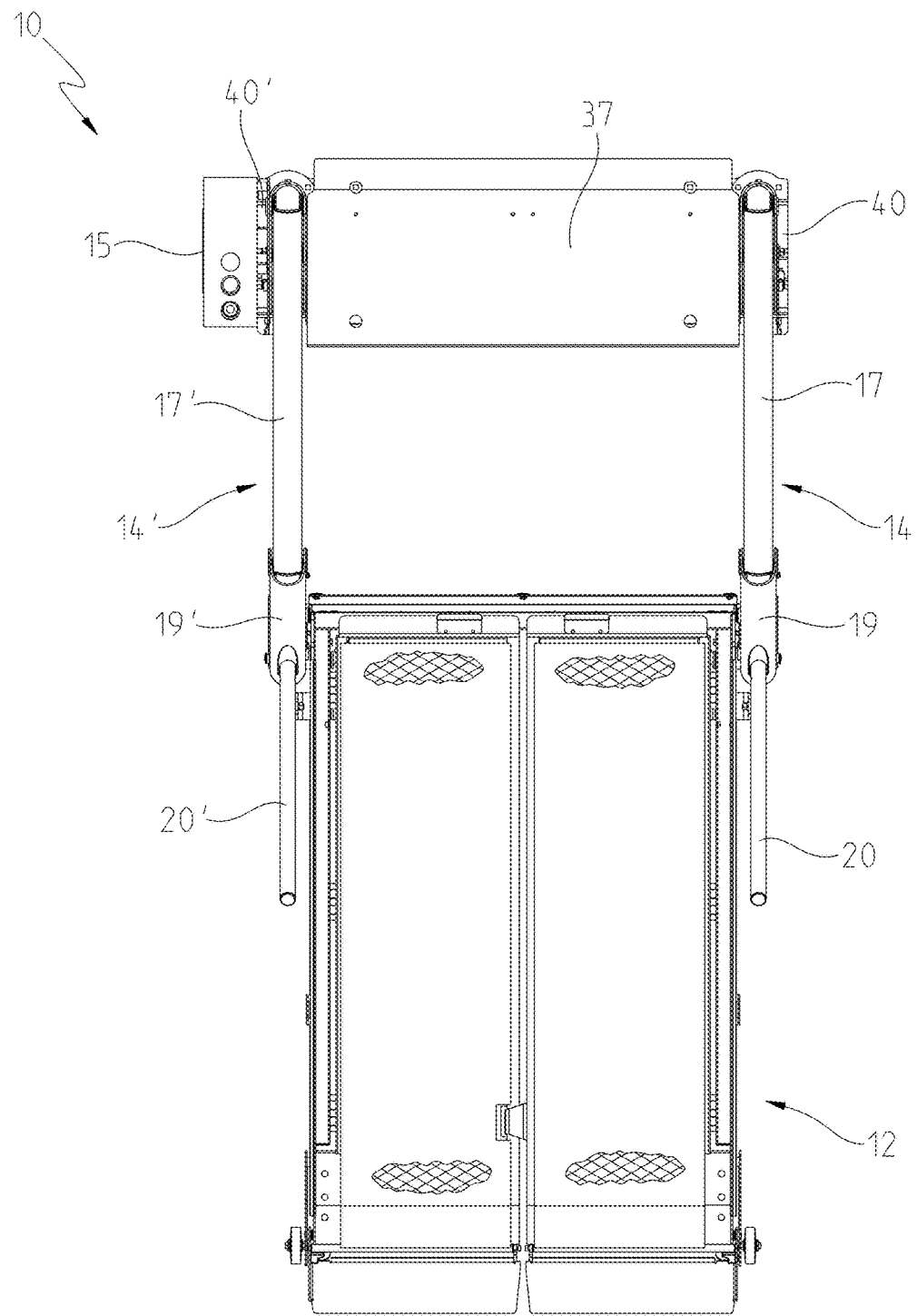
FIG. 3 represents a top view of the illustrative vehicle lift assembly of FIG. 1.
Figure 4:
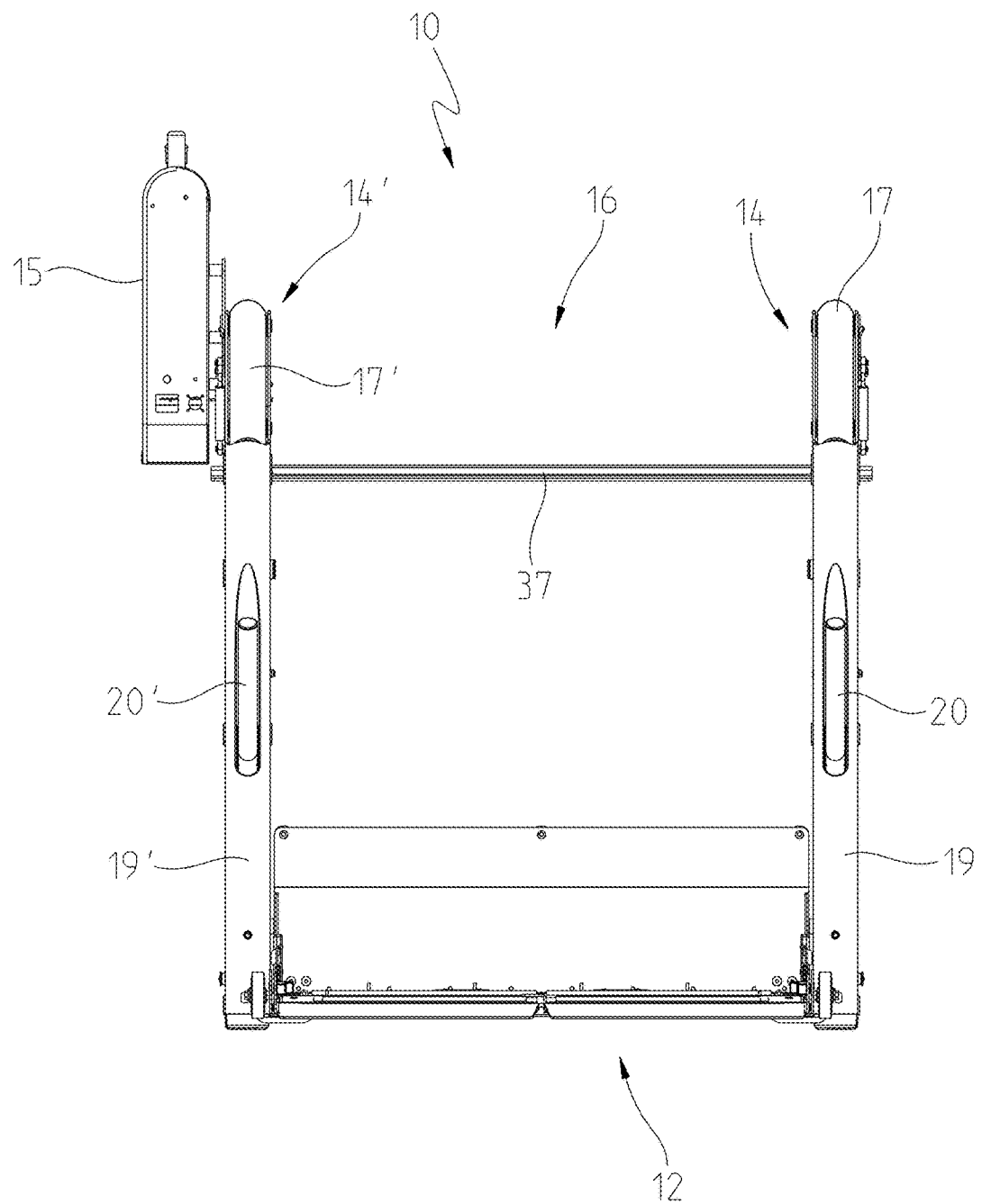
FIG. 4 represents a front view of the illustrative vehicle lift assembly of FIG. 1.
Figure 5:
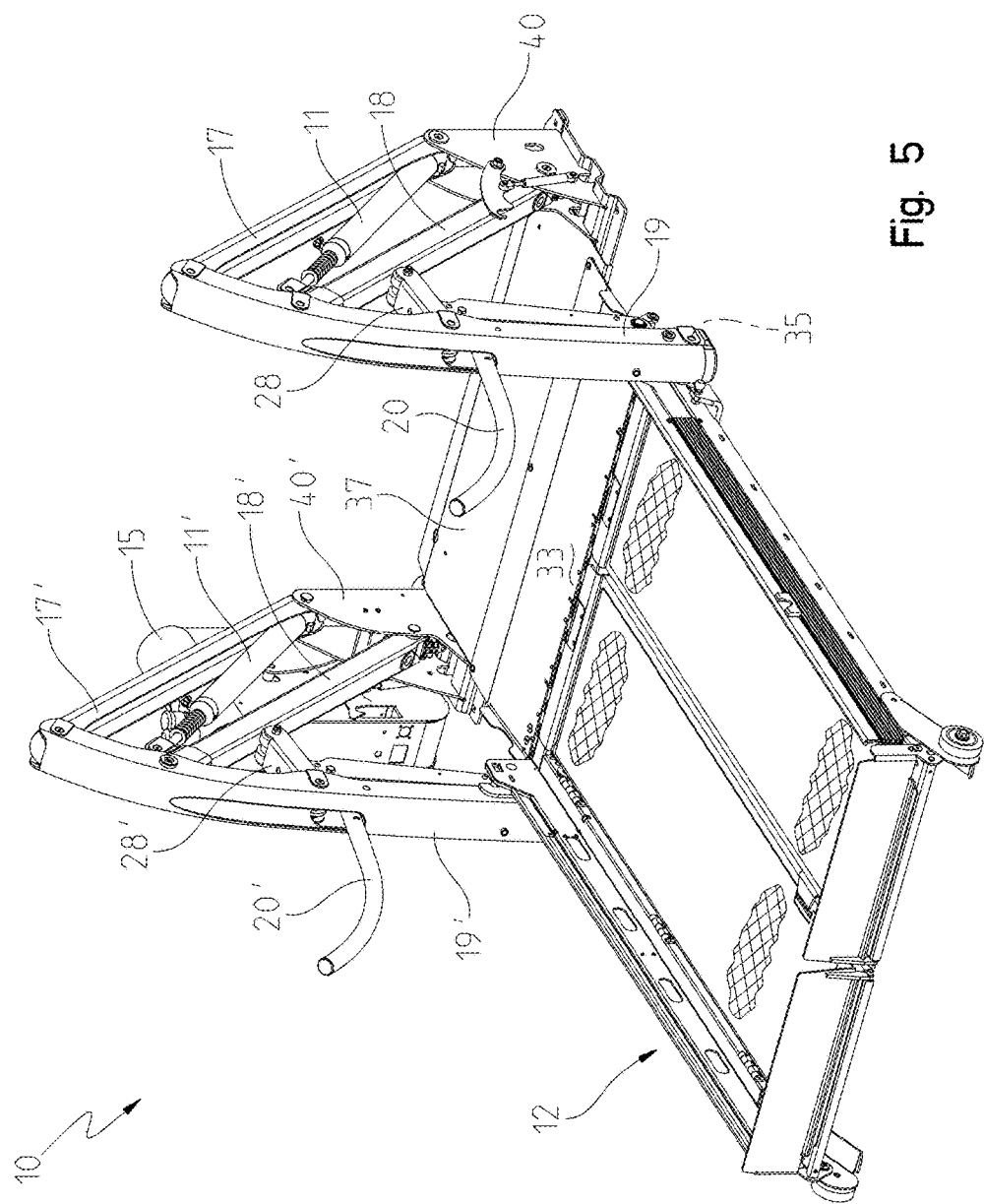
FIG. 5 represents a perspective view of the illustrative vehicle lift assembly of FIG. 1 shown in the vehicle loading position in accordance with one embodiment of the present teachings.
Figure 6:
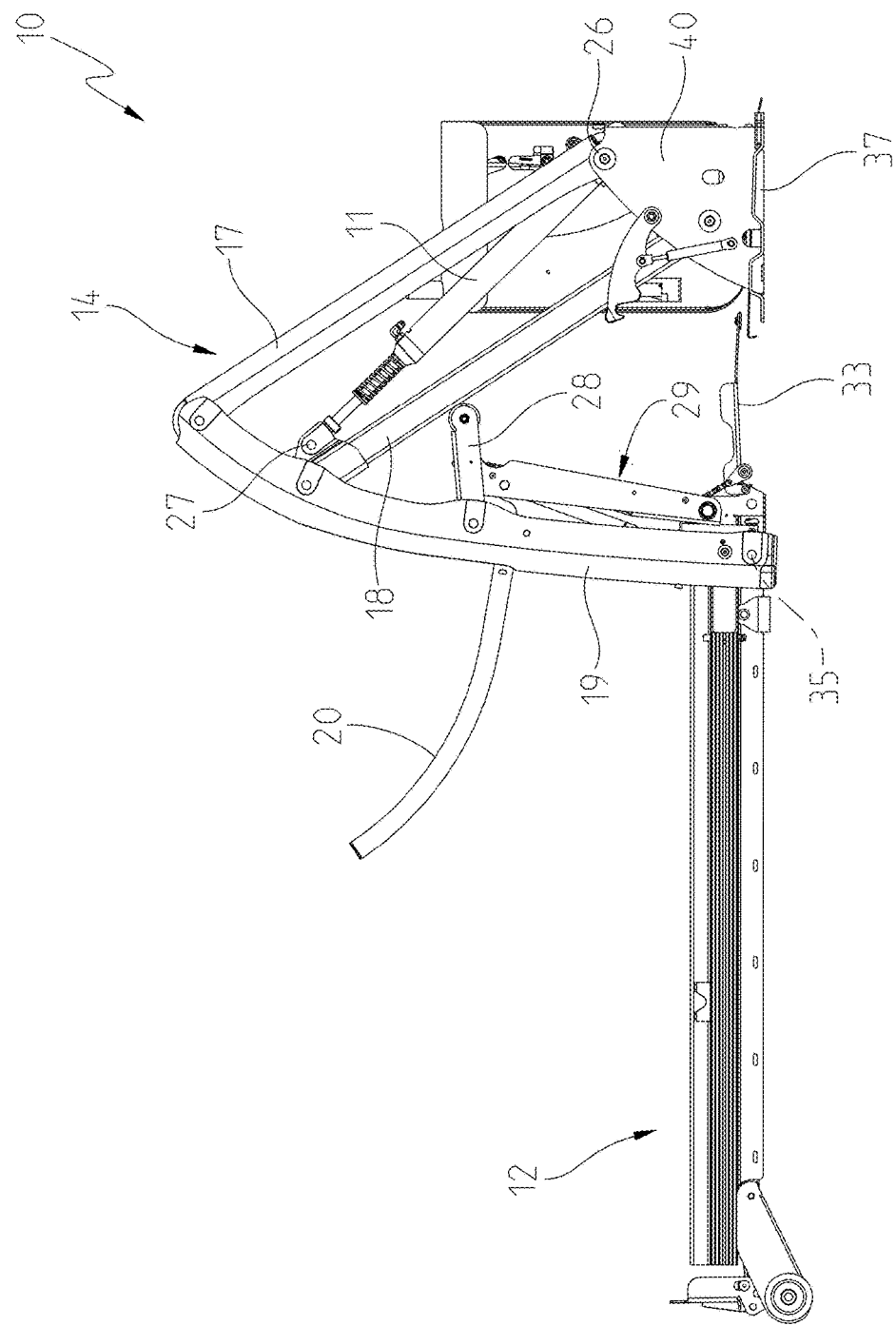
FIG. 6 represents a side view of the illustrative vehicle lift assembly of FIG. 5.
Figure 7:
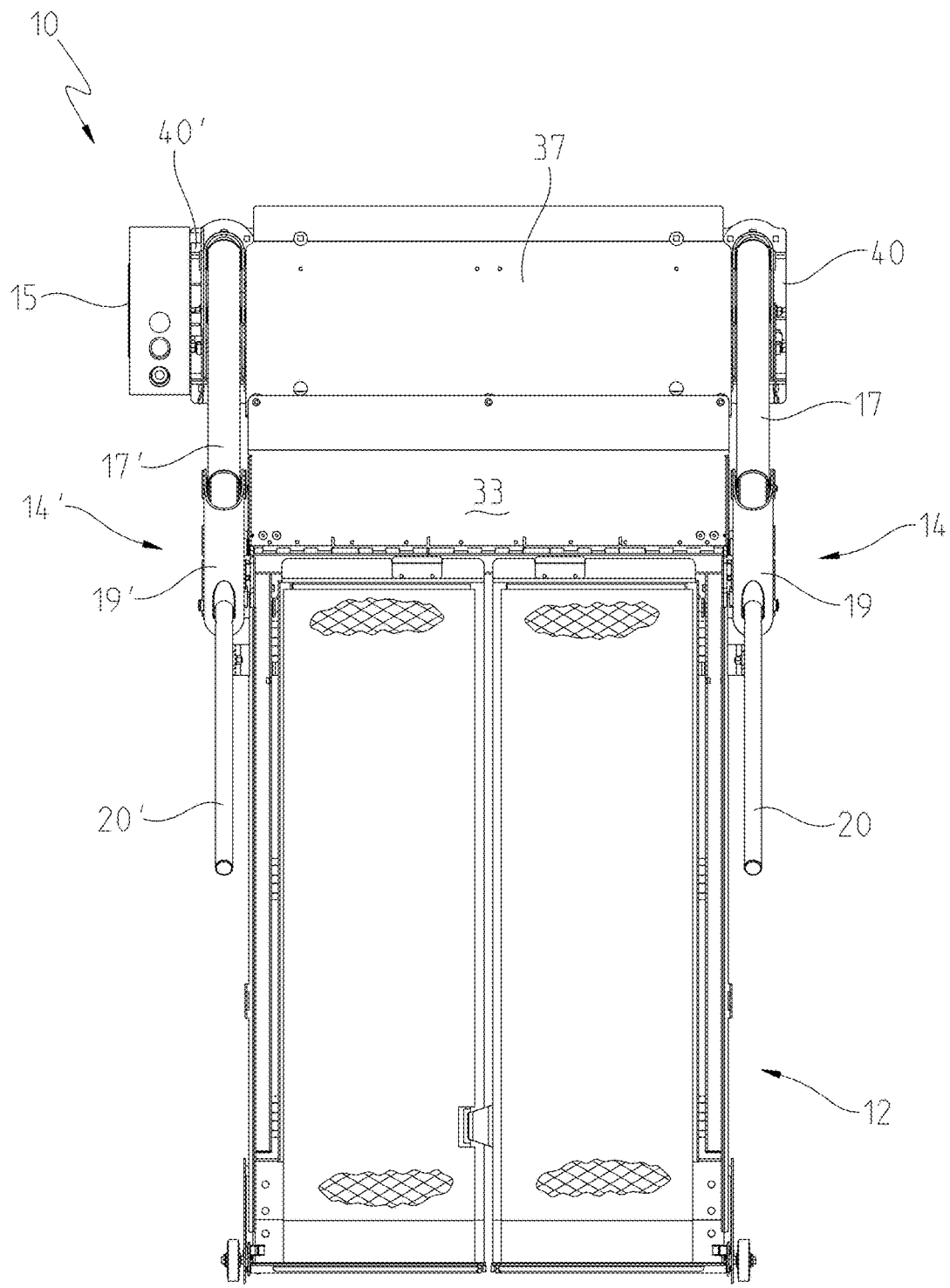
FIG. 7 represents a top view of the illustrative vehicle lift assembly of FIG. 5.
Figure 8:
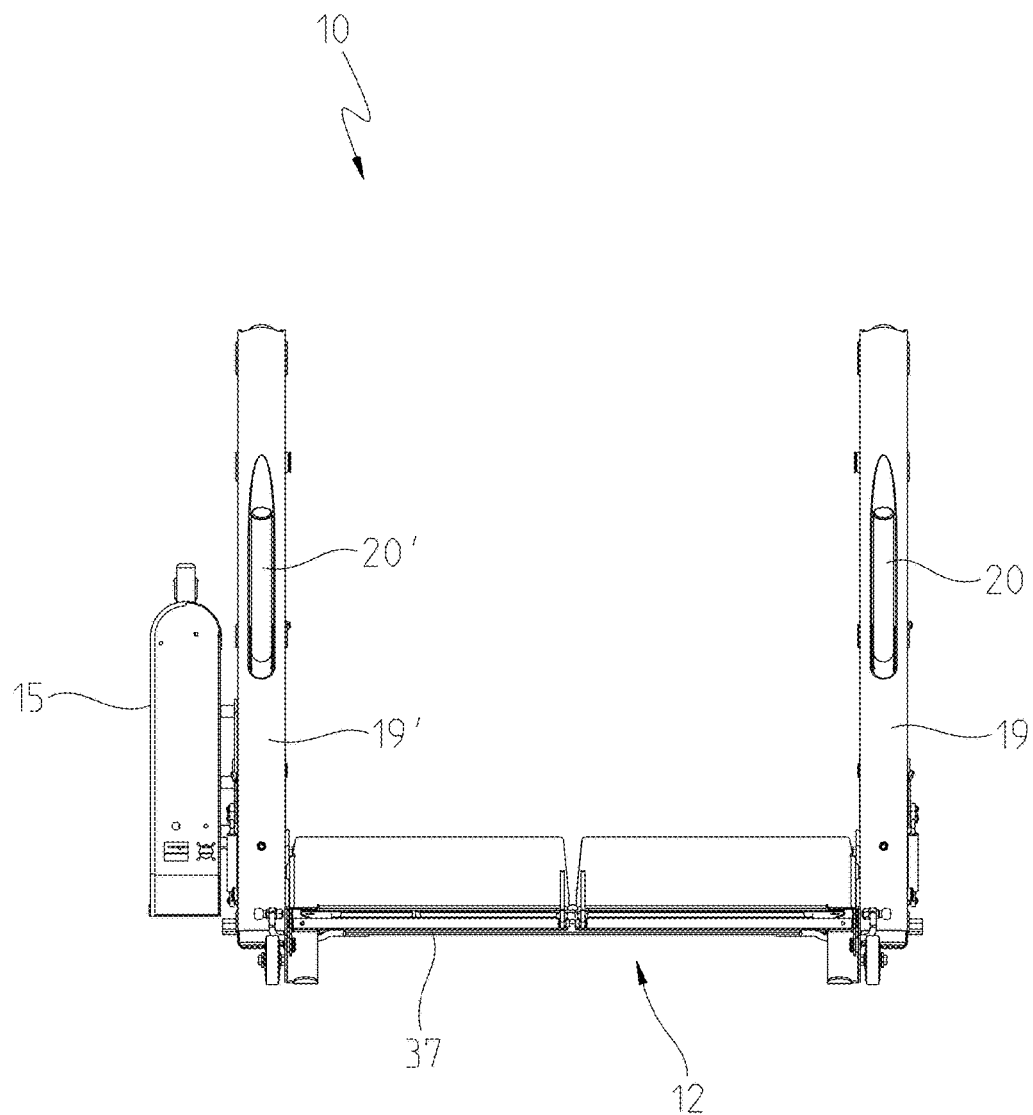
FIG. 8 represents a front view of the illustrative vehicle lift assembly of FIG. 5.
Figure 9:
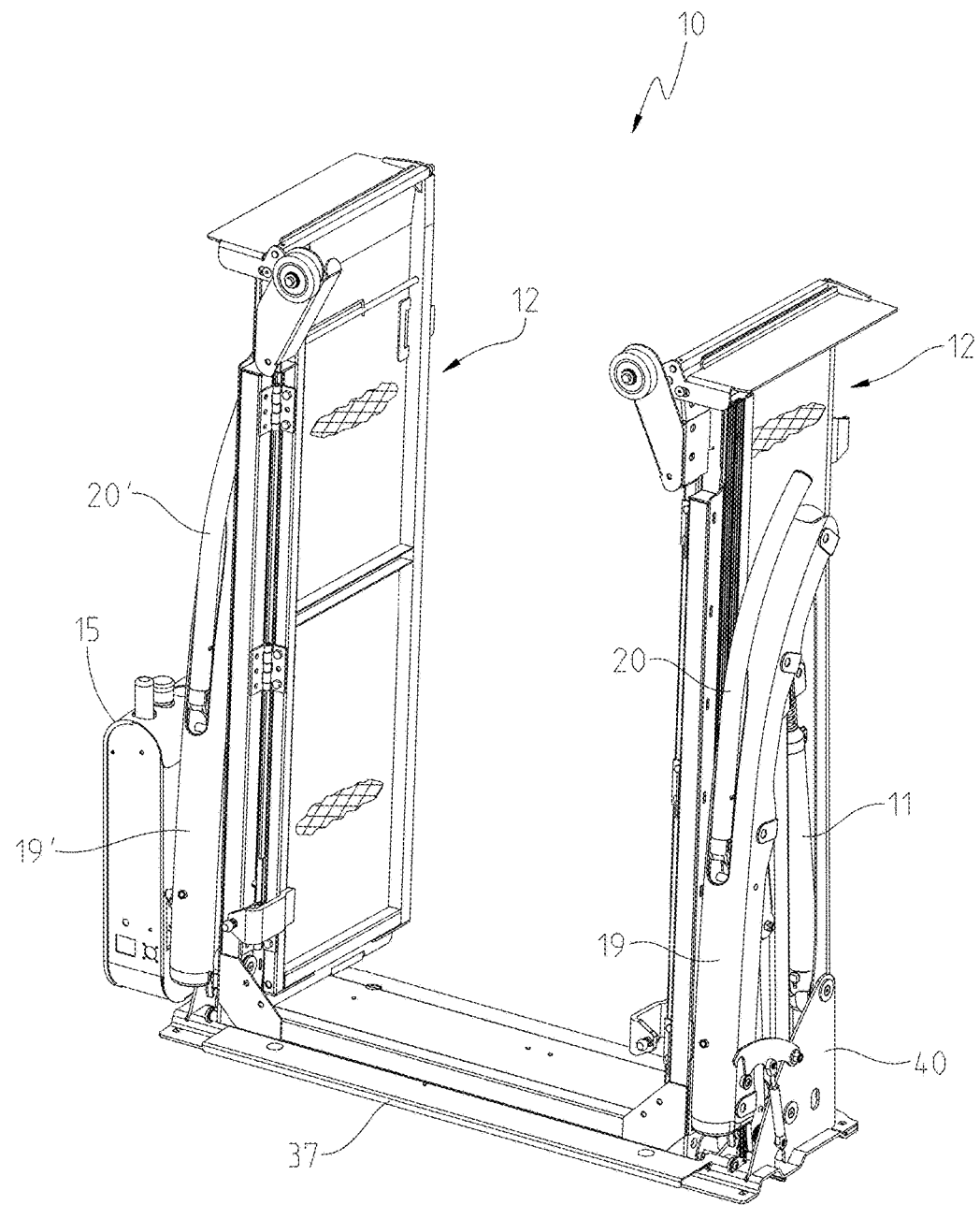
FIG. 9 represents a perspective view of the illustrative vehicle lift assembly of FIG. 1 shown in a vertical stowage position in accordance with one embodiment of the present teachings.
Figure 10:
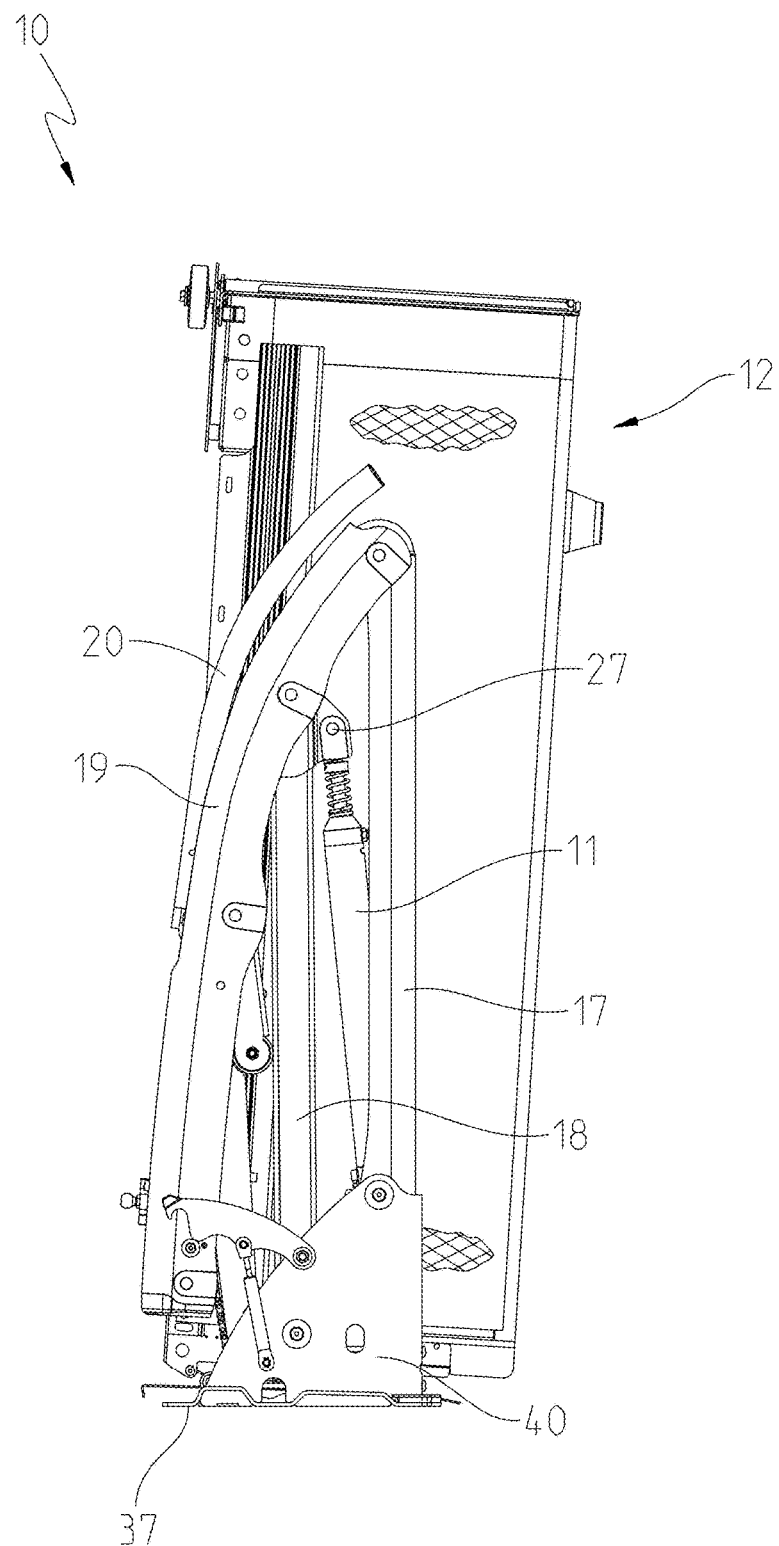
FIG. 10 represents a side view of the illustrative vehicle lift assembly of FIG. 9.
Figure 11:
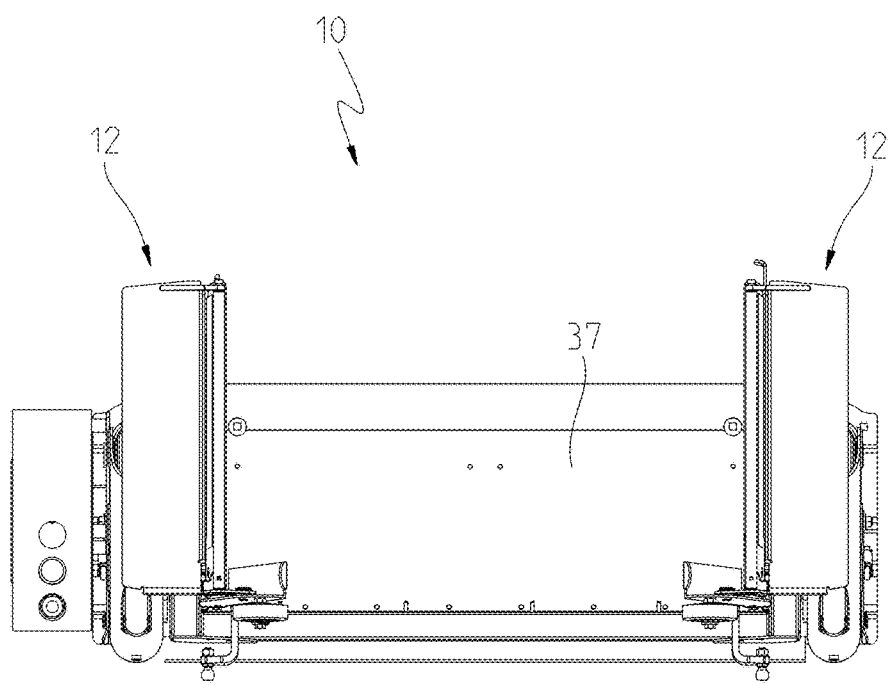
FIG. 11 represents a top view of the illustrative vehicle lift assembly of FIG. 9.
Figure 12:
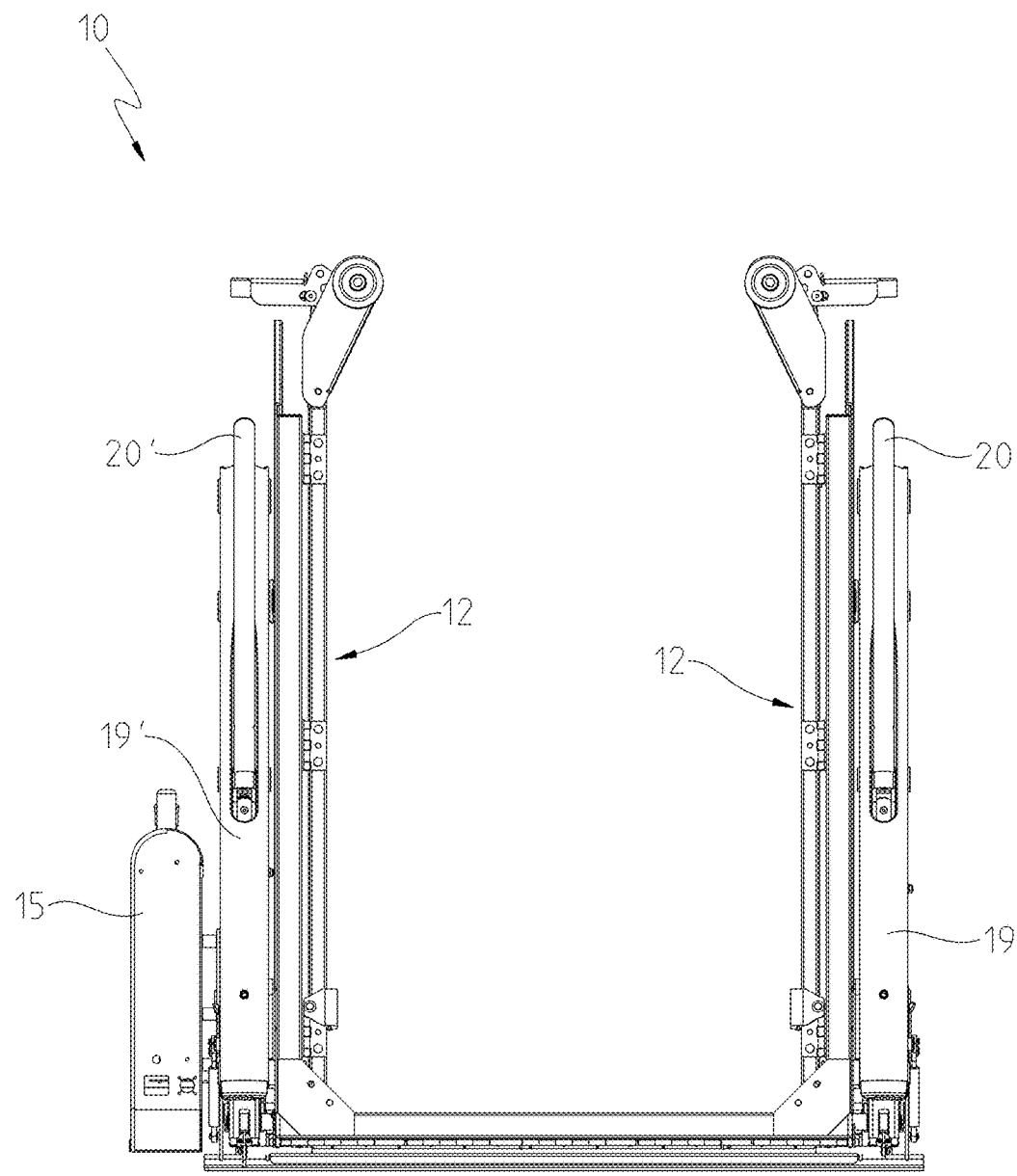
FIG. 12 represents a front view of the illustrative vehicle lift assembly of FIG. 9.
Figure 13:
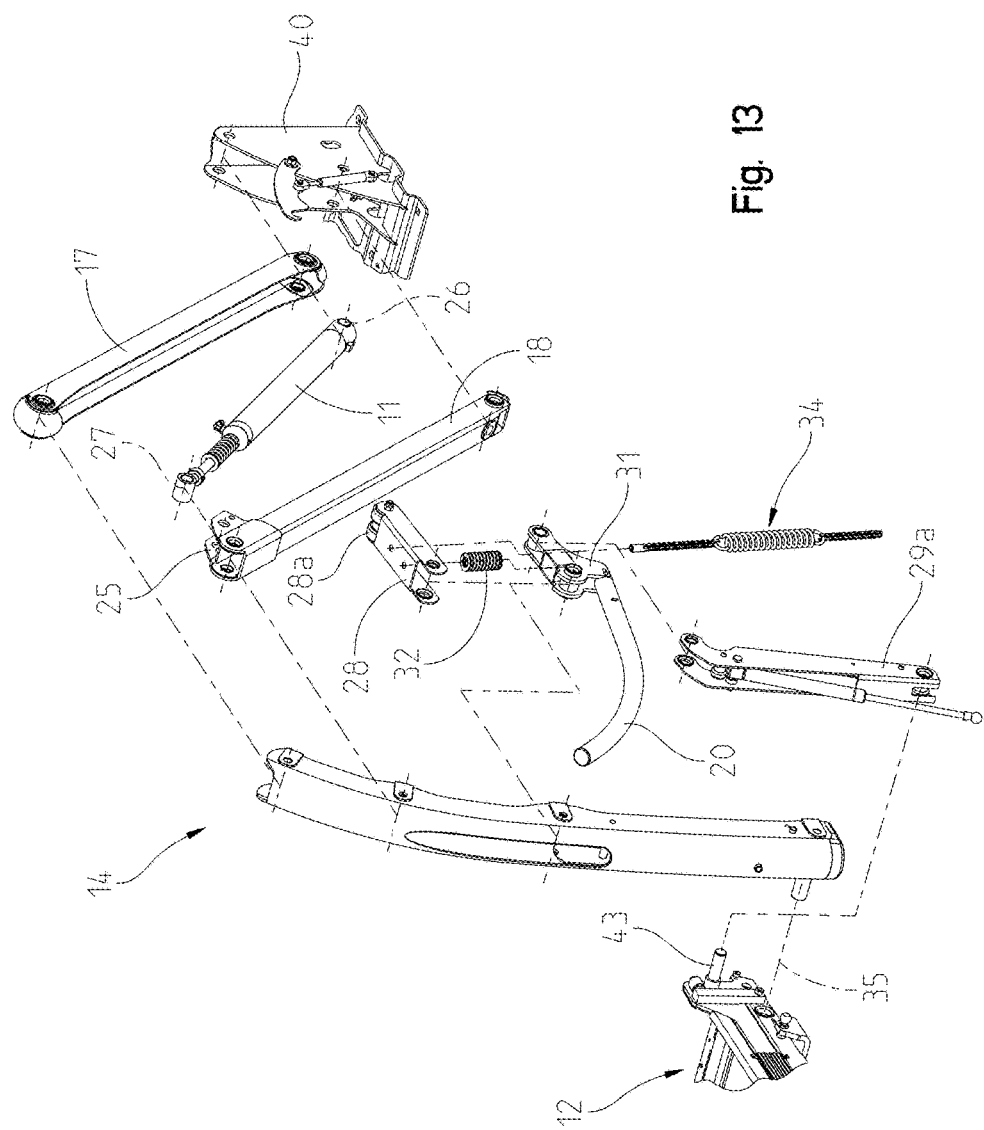
FIG. 13 represents an exploded perspective view of a parallelogram arm lifting assembly in accordance with one embodiment of the present invention.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Unless defined otherwise, all technical and scientific terms used herein have the same meaning as commonly understood by one of ordinary skill in the art to which this invention belongs. Although any method and materials similar or equivalent to those described herein can be used in the practice or testing of the present invention, the specific methods and materials are now described. Moreover, the techniques employed or contemplated herein are standard methodologies well known to one of ordinary skill in the art and the materials, methods and examples are illustrative only and not intended to be limiting.

FIGS. 1-4 show the general arrangement of an illustrative vehicle-mounted parallelogram-type wheelchair lift 10 with a platform assembly 12 at ground level (in the loading position). In accordance with this illustrative embodiment, while the vehicle is described, by way of example, with respect to a left-hand drive vehicle, it should be understood and appreciated herein that the lift may be mounted in a right-hand drive vehicle too. In this case, it should also be understood and appreciated that it is not necessary to convert the parts to their mirror image, although that may easily be done if desired. In addition, and for clarity and conciseness, several of the drawings omit parts that are not essential in that drawing to a description of a particular feature, aspect or principle of the invention being disclosed. Moreover, it should be further understood and appreciated herein that many of the components and subassemblies of the parallelogram-type vehicle lift shown in the following figures are illustratively disposed substantially symmetrically about a vertical plane of symmetry (or centerline) of the vehicle. For simplicity and clarity, corresponding parts or elements on each side of the centerline may be referred to by the same label numbers with the label for one side distinguished by a prime symbol.

The lift 10 is shown mounted to a vehicle (V) at its floor (F) adjacent a right-hand side door D. It should also be noted that the inboard/outboard loading and unloading orientations are indicated by arrows IB/OB. The parallelogram lift 10 comprises platform assembly 12 (also referred to herein as the "lift platform"), paired parallelogram arm lifting assemblies or linkages 14, 14', vehicle mounting base assembly 16 including mounting plate or baseplate 37, and hydraulic pump/control assembly 15 mounted to the vehicle V at the side door (D) opening.

Figure 16:
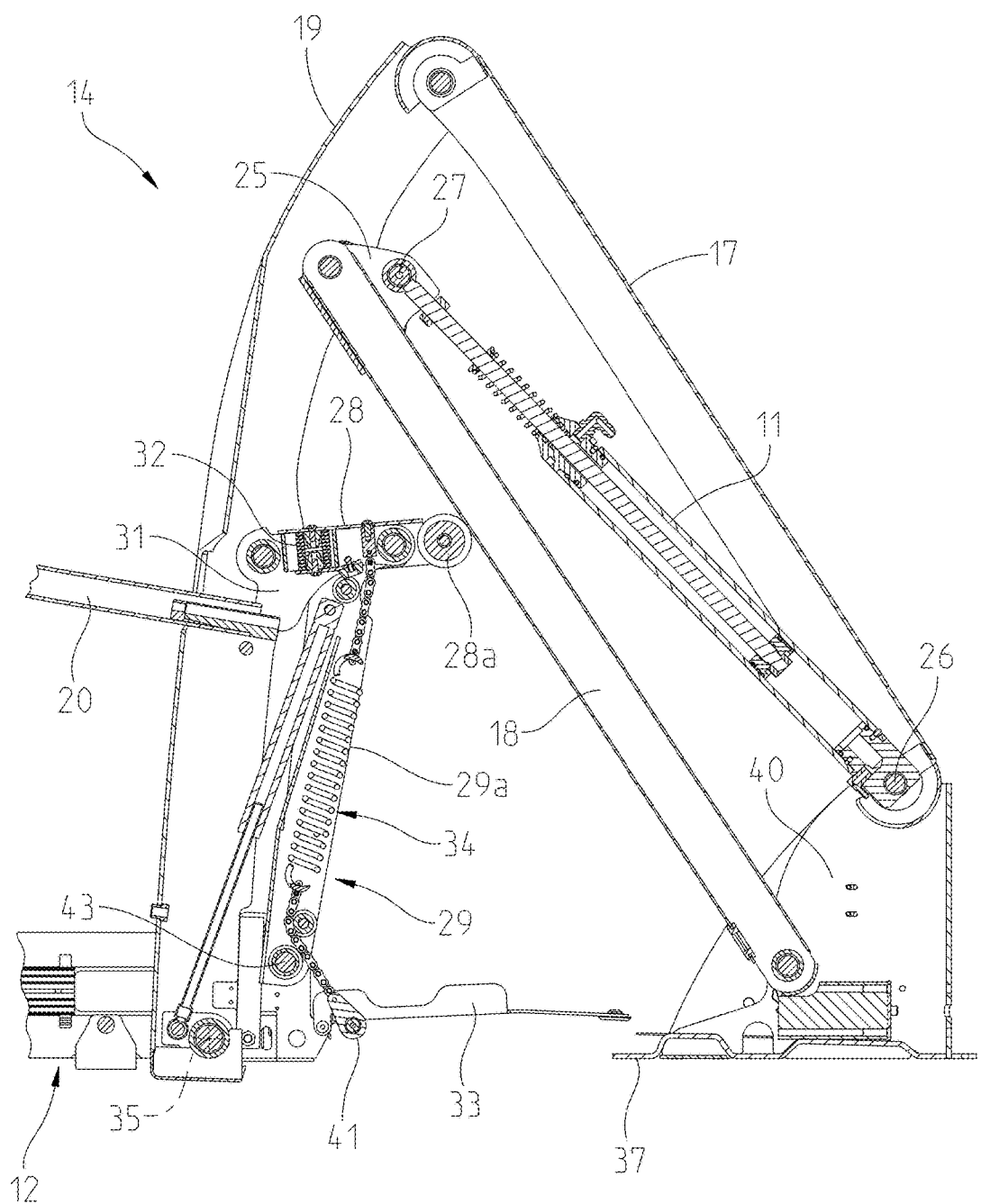
FIG. 16 represents a side cross-sectional view of a parallelogram arm lifting assembly taken along line 16-16 of FIG. 14.
Figure 17:
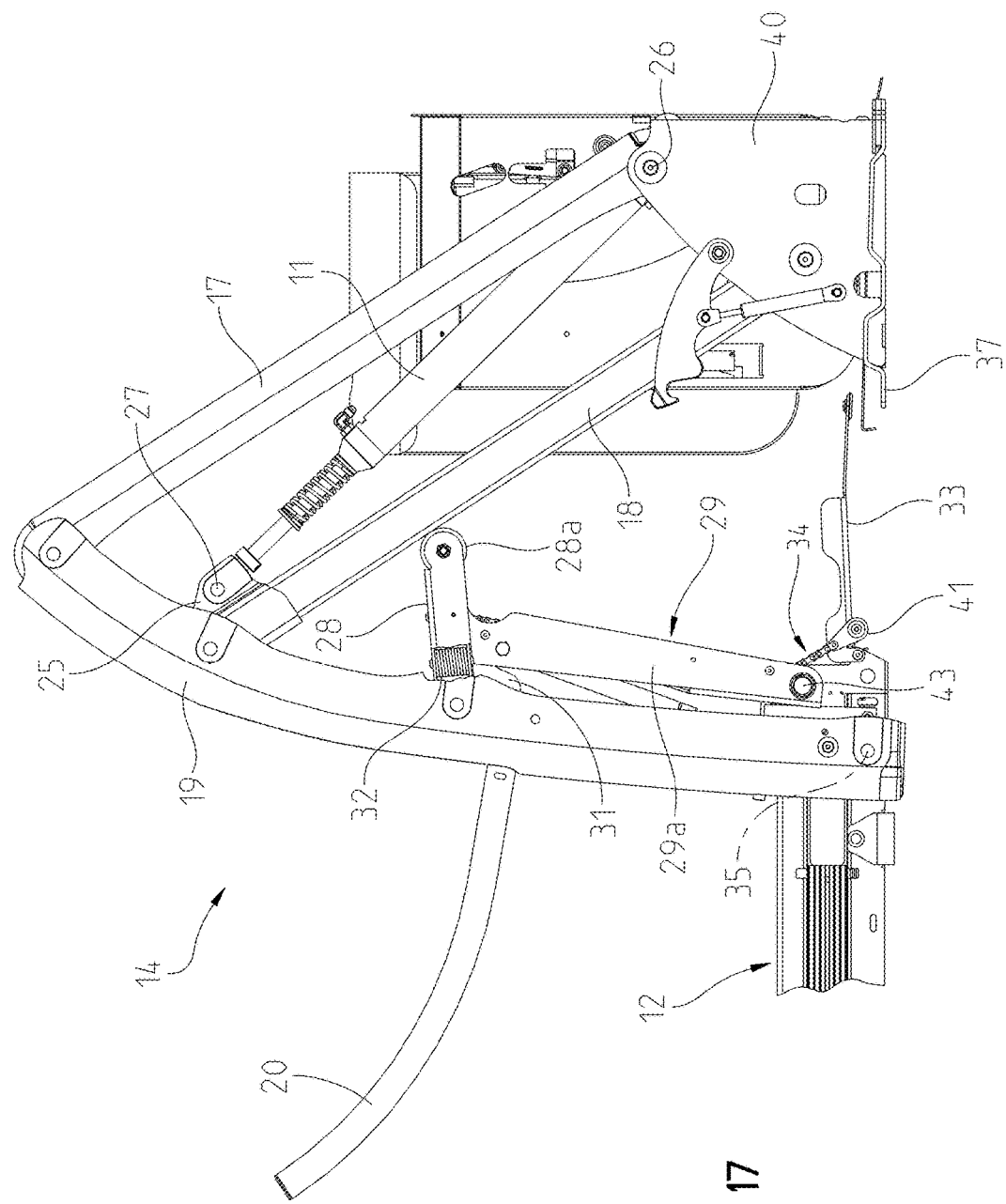
FIG. 17 represents a side view of the parallelogram arm lifting assembly of FIG. 14, wherein the bottom parallel arm is contacting the roller portion of the inboard barrier's pivoting elbow member.
Figure 18:
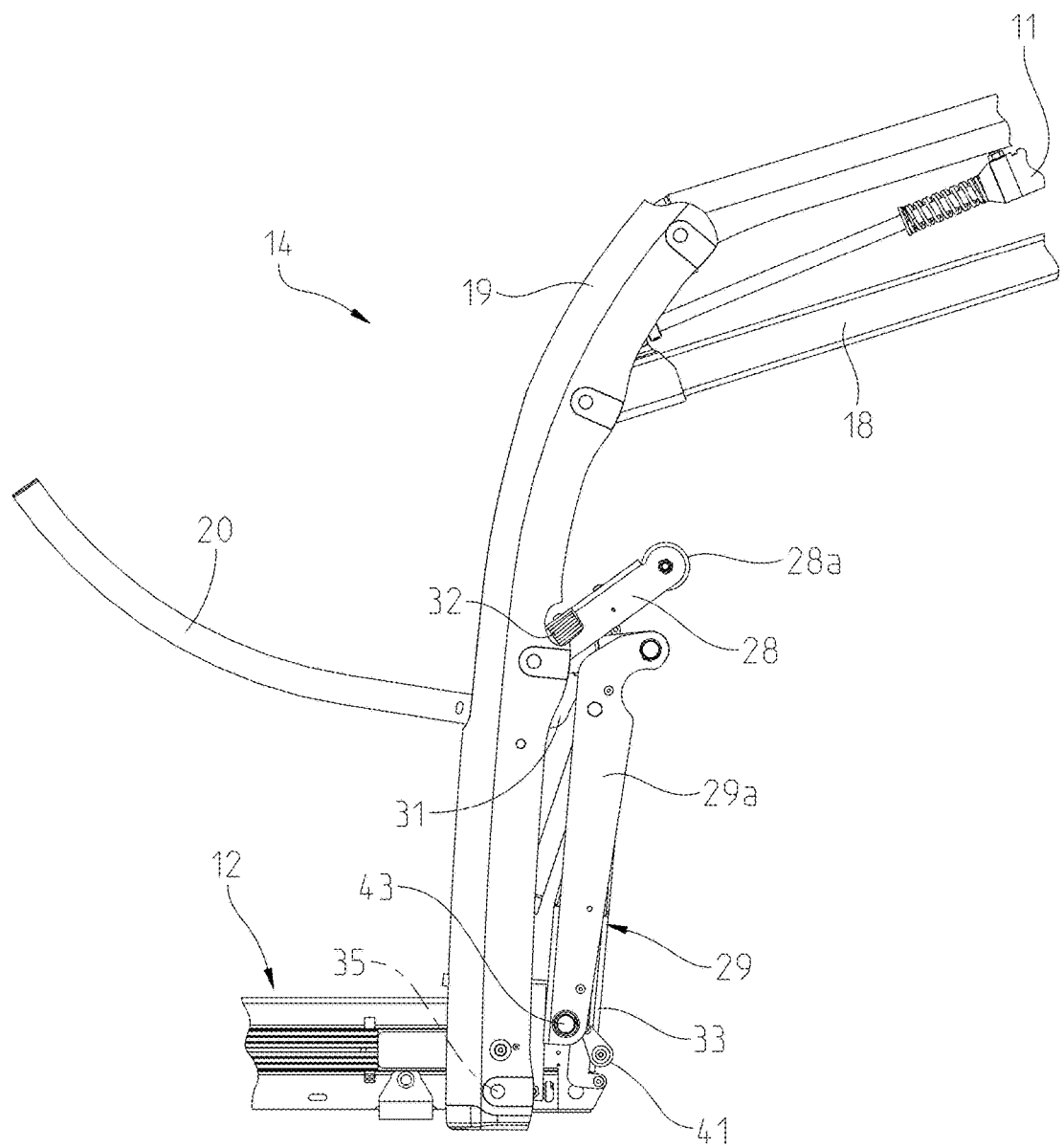
FIG. 18 represents another side view of the parallelogram arm lifting assembly of FIG. 14, wherein the bottom parallel arm is separated from the roller portion of the inboard barrier's pivoting elbow member.

Each parallelogram arm lifting assembly 14, 14' comprises an upper arm 17, 17' and a lower arm 18, 18', a vertical channel end link 19, 19' and a base-mounted bracket member or side support assembly tower/frame 40, 40', including a baseplate weldment, which serves as a base link for arms 17, 17' and 18, 18'. The platform assembly 12 is pivotally connected to the end links 19, 19' at pivot point 35, while the lower portion of each vertical channel end link 19, 19' is provided with a mechanism 29, 29' that causes the inboard barrier 33 to move in an automatic or otherwise coordinated manner relative or in response to the platform state (e.g., raising, lowering, etc.). In accordance with certain aspects herein, the vehicle lift 10 can employ a system or assembly of linkage members, such as arms, to move and synchronize the inboard barrier 33 relative to the elevation of the lift platform 12 (see, for example, U.S. Pat. No. 6,238,169, the disclosure of which is incorporated by reference herein in its entirety). In accordance with one illustrative embodiment, the vehicle lift 10 has a stowable lift platform 12 and an inboard barrier 33 pivotably coupled thereto that is actuated by an inboard barrier linkage mechanism 29, 29' for movement between a raised safety position and a lowered bridging position in synchronism with the elevation of the lift platform 12. The linkage mechanism 29, 29' has a pivoting elbow member 28, 28' for pivoting the lift platform 12 from the horizontal transfer position to a generally vertical stowed position. In operation, the pivoting elbow member 28, 28' has a roller portion 28a, 28a' (see FIGS. 16-18, for instance) that contacts the lower parallelogram arm 18, 18' during platform lifting so that a push or fold arm 29a of the linkage mechanism is moved downwardly. A chain/spring link 34, which couples the fold arm 29a to the inboard barrier 33, causes the barrier to rotate from a raised position to a substantially horizontal position to act as a bridgeplate at the transfer level (see FIGS. 5-8).

It should be understood and appreciated herein that the various arms/linkages of the arm lifting assemblies 14, 14' disclosed herein may have pivot points or connections that are in the form of plug-in pin connections. In addition, these pivot points may include bushings (not shown) within their respective bores to reduce wear on their associated parts.

The outboard end of the lift platform 12, in accordance with certain aspects herein, includes a roll stop safety barrier 24 for preventing a wheelchair occupant from accidentally falling from the lift platform, particularly when it is raised above ground elevation. It should be understood and appreciated herein that a variety of actuation strategies can be used for raising and lowering the roll stop safety barrier 24. Such actuation mechanisms include, for instance, cables, chains and levers, with or without gas spring or linear actuator assist mechanisms.

In accordance with certain aspects herein, the upper parallel arms 17, 17' and the end links 19, 19' are constructed of metal channels each having U-shaped cross sections. In accordance with these embodiments, the side edges of the end link U-channels 19, 19' and side supports 40, 40' (base links) are spaced a sufficient width apart to permit receiving (nesting) of the ends of the arms 17, 17' and 18, 18'.

Hydraulic cylinders 11, 11' are pin connected diagonally to opposite corners of the parallelogram linkages 14, 14', and are oriented with the base end of each cylinder 11, 11' coupled via pin connections 26 in the base-mounted bracket member or side support assembly tower 40, 40' and the rod end of each cylinder coupled via pin connections 27 associated with end links 19, 19'. In accordance with certain aspects herein, when the platform assembly 12 is in the lowered or loading position (see FIGS. 1-4) the piston rod of the cylinder 11, 11' is at full extension from upper right rear to lower left front of the parallelogram. On the other hand, when the platform assembly 12 is in the folded stowed position (see FIGS. 9-12) the rod is fully retracted within the cylinder 11, 11'. Pressurization on the rod side of the piston head moves the piston rod from its extended position into its retracted position within the cylinder. Thus, each parallelogram linkage 14, 14' is pulled by the rod at pin connections 27, 27' and this pulling force is what swings the arms 17, 17' and 18, 18' into an upright position.

Referring now to FIGS. 13-18, the operation of the inboard barrier linkage mechanism 29, 29' will now be described in more detail. While the lift 10 is at the ground level loading position of FIGS. 1-4, the wheelchair user rolls onto the platform 12 at the outboard end. Each end link 19, 19' is provided with an arm rest 20, 20' which are utilized by the wheelchair user for auxiliary support during lifting. The arm rests 20, 20' are pivotally connected to the end links 19, 19' and are further coupled with the inboard barrier linkage mechanism 29, 29' via the pivoting elbow member 28, 28' so that as the platform is caused to tilt upward during folding, the arm rests 20, 20' pivot to a closed position as shown in FIGS. 9-12.

As the lift 10 moves from the stowed position (see, FIGS. 9-12) to the vehicle floor level (see, FIGS. 1-4), the roller portion 28a, 28a' of the pivoting elbow member 28, 28' follows the bottom surface of the lower arm 18, 18', which in turn allows the lift platform 12 to unfold. As the lift platform 12 moves from vehicle floor level to approximately 2" below the vehicle floor level, the roller portion 28a, 28a' remains in contact with the bottom surface of the lower arm 18, 18', but allows the pivoting elbow member 28, 28' to separate from the fold arm/handrail link 31 via an internal die spring 32. This movement raises the inboard barrier 33 via the roller chain/spring link 34 between the pivoting elbow member 28, 28' and the inboard barrier pivot pin 41.

As the lift platform 12 moves from approximately 2" below the vehicle floor level to the ground level, the roller portion 28a, 28a' of the pivoting elbow member 28, 28' separates from the bottom surface of the lower arm 18, 18', and the inboard barrier 33 remains in the raised position. If, during this time, the inboard barrier 33 is not in the raised position, the movement of the lift will stop via a switched interlock that detects when the inboard barrier is raised.

Once the lift platform 12 approaches approximately 2" below vehicle floor level from ground level, the roller portion 28a, 28a' of the pivoting elbow member 28, 28' initiates contact with the bottom surface of the lower arm 18, 18'. As the lift platform 12 moves from approximately 2" below vehicle floor level to the vehicle floor level, the contact between the roller portion 28a, 28a' of the pivoting elbow member 28, 28' and the bottom surface of the lower arm 18, 18' compresses the internal die spring 32 between the pivoting elbow member and the fold arm/handrail link 31. This movement lowers the inboard barrier 33 via the roller chain/spring link 34 between the pivoting elbow member 28, 28' and the inboard barrier pivot pin 41, thereby providing a bridge between the vehicle and the lift platform 12.

As the lift platform 12 moves from the vehicle floor level to the stowed position, the roller portion 28a, 28a' of the pivoting elbow member 28, 28' follows the bottom surface of the lower arm 18, 18' which allows the platform to fold when the pivoting elbow member contacts the fold arm/handrail link 31. Once the pivoting elbow member 28, 28' contacts the fold arm/handrail link 31, the platform 12 begins to fold by transferring load through the fold arm 29a of the inboard barrier mechanism 29, 29' to the platform fold pin 43.

It should be understood and appreciated herein that other types of inboard barrier system designs have been used with wheelchair lifts, such as, the system disclosed in U.S. Pat. No. 7,441,995 to the Braun Corporation of Winamac, Ind., the disclosure of which is incorporated in its entirety herein by this reference. As those of skill in the art will understand, the various inboard barrier designs may differ, particularly with respect to their linkage systems. For instance, the linkage systems may include a spring coupling a brace arm to a push arm, or may include a telescoping push arm having an upper member and a lower member, a brace arm, and a gas spring biasing the two arms to a desired angle about a pivot point.

Figure 14:
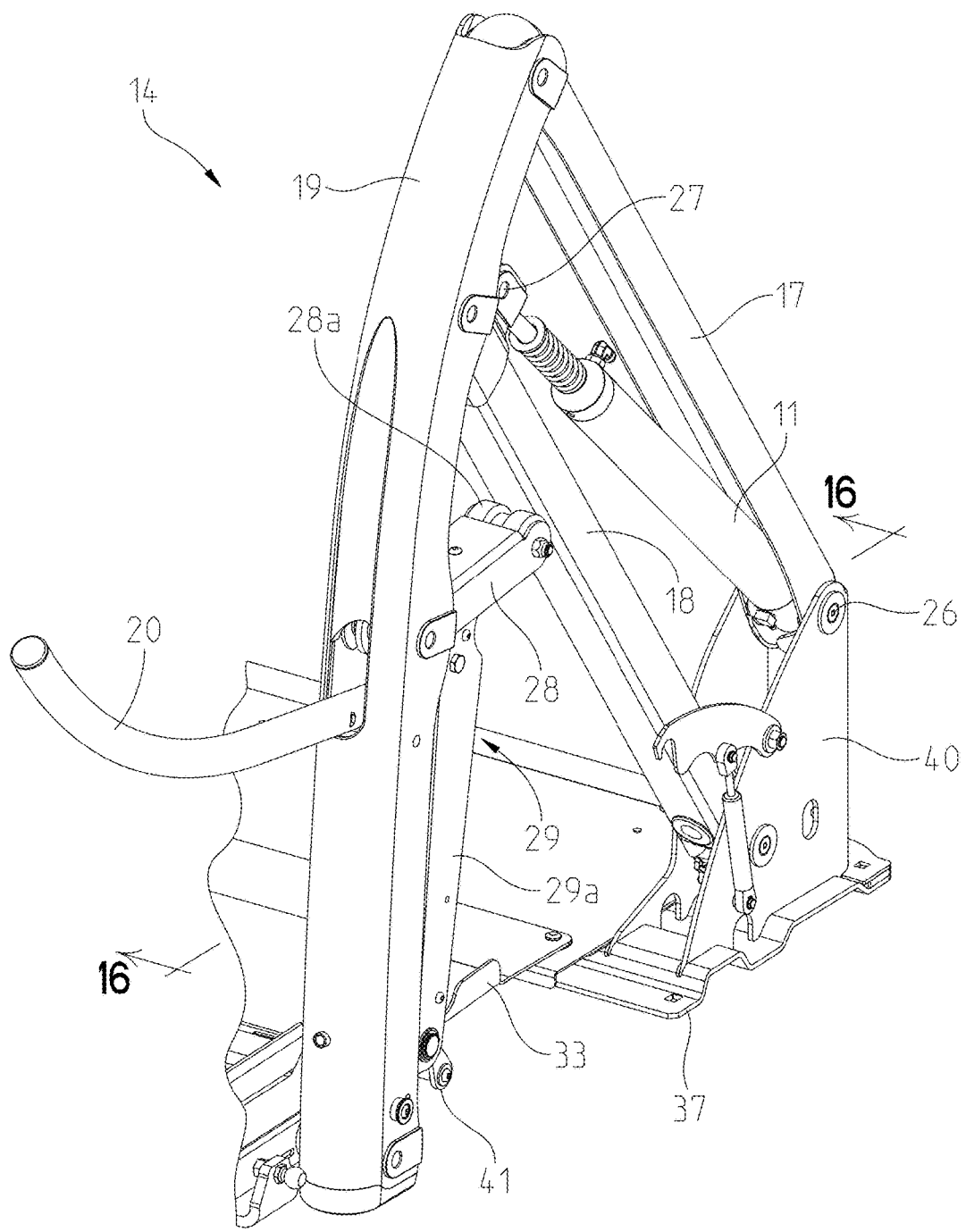
FIG. 14 represents a partial front perspective view of a parallelogram arm lifting assembly in accordance with one embodiment of the present invention.
Figure 15:
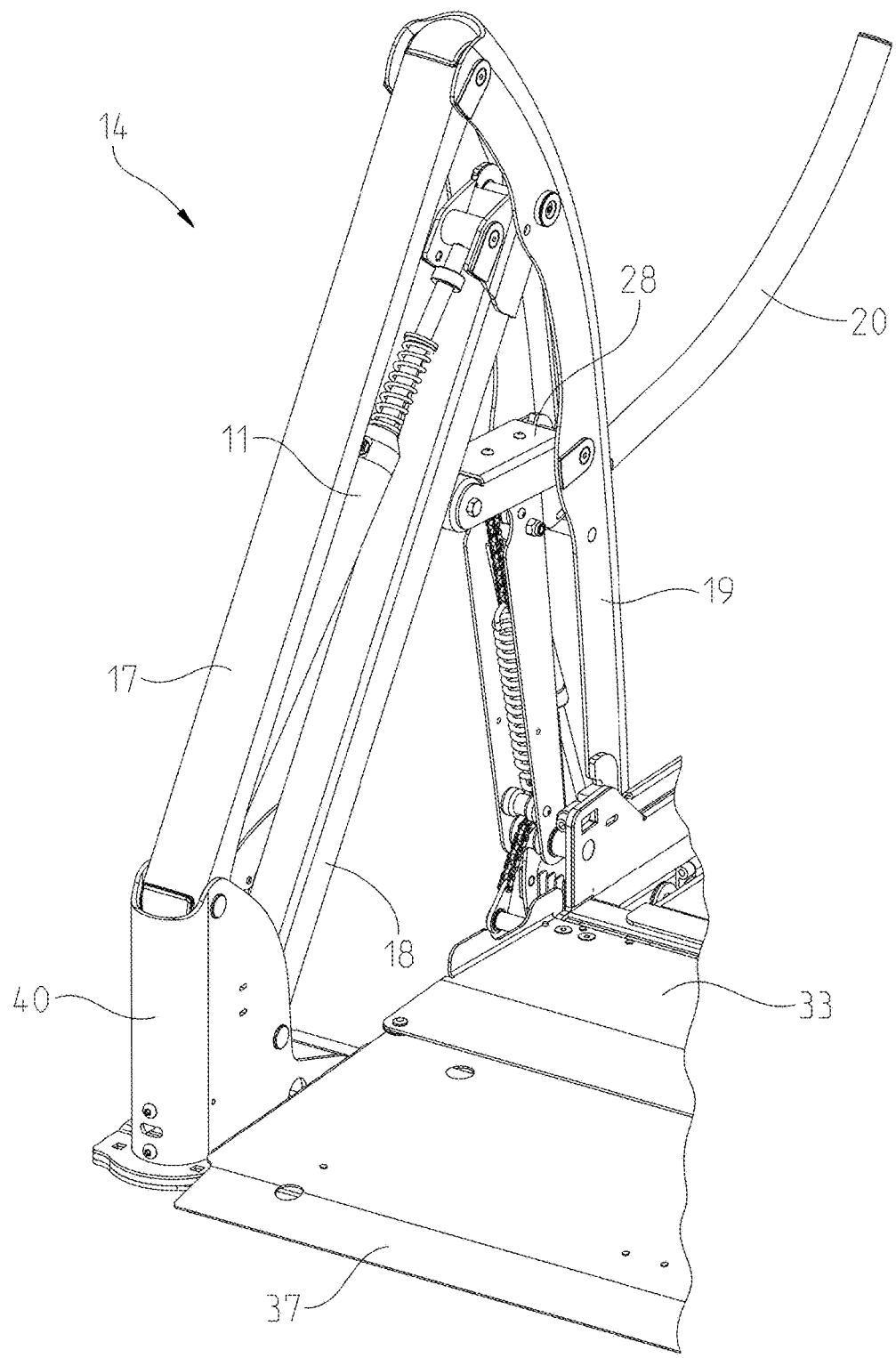
FIG. 15 represents a partial rear perspective view of the parallelogram arm lifting assembly of FIG. 14.

Focusing now on FIGS. 14-15, in accordance with certain embodiments herein, the upper portion of the vertical channel end link 19, 19' is curved to offset any displacement between the pivot point connections in which the lower arm 18, 18' and the upper arm 17, 17' couple to the vertical channel end linkage. The lower portion of the vertical channel end link 19, 19', on the other hand, is less curved in order to permit compactness and rigidity. In accordance with certain embodiments herein, the vertical channel end link 19, 19' exhibits a continuously curved profile that extends along the entire length of the lift arm. In addition, the back edge of the end linkage 19, 19' has a rounded face that includes a nearly constant radius.

While not required herein, in accordance with certain aspects of the present invention, the end linkage 19, 19' can have a varying thickness from top to bottom along the entire length of the lift arm. In accordance with this illustrative embodiment, the thickness is greater towards the top and then gets thinner towards the bottom of the lift arm where it couples to the lift platform 12.

According to certain embodiments, the vertical channel end link 19, 19' is constructed of one piece and does not have any weld seams or other connecting locations. It is produced by a deep drawing manufacturing process in which the metal material is progressively formed into a three-dimensional shape through the mechanical action of a die forming the metal around a punch. First, a laser cuts the blank to be formed. Next, a draw die forms the overall shape as well as the emboss feature for the arm rests 20, 20'. A pierce and size die produces the opening for the arm rests 20, 20' and any other holes/features in the face of the vertical channel, as well as sizes the part. A trim die produces the profile of the outer edge of the vertical channel end link 19, 19', and a pierce die produces the hole and other features on each side of the vertical channel. The part is then washed to remove dirt, oil and other debris, and then the metal undergoes a finishing process.

The vertical channel end link 19, 19' has a substantially U-shaped profile having a back surface and two side walls, which are arranged substantially perpendicularly to the back surface and parallel to each other. Provided in the side walls are boreholes or apertures for receiving the hinged connections of the parallel arms 17, 17' 18, 18'. As explained above, bushings may be fitted into boreholes or apertures so that no or minimal wear occurs of the components.

The upper parallel arm 17, 17', in accordance with certain embodiments, may also have a substantially U-shaped cross-section. For instance, the arm 17, 17' has a back surface and two side walls substantially parallel to each other. In addition, a passage is respectively provided in the transitional region between each side wall and the back surface.

The lower parallel arm 18, 18', unlike the upper parallel arm 17, 17' and the vertical channel end link 19, 19', does not have a U-shaped cross-section, and instead, has a rectangular or square-shaped cross-section. More particularly, it has been found through studying cam profiles on the lower arms of various lifting assemblies that some designs experience a slamming effect during the folding process. To resolve this issue, it has been discovered that refining the design can slow down the folding speed of the platform, thereby minimizing the slamming effect. Unlike traditional lift designs, the present invention utilizes a lift design that has a boxed (closed) lower parallel arm 18, 18' configuration. In addition to reducing the slamming effect, the closed design also increases the rigidity of the lift arm.

In optimizing the shape and configuration of the closed arm configuration, it was determined that a correlation exists between the folding speed of the arm and the hinge pin location. By analyzing the angle speed of the upper arm 17, 17' as a function of piston length/time, it was possible to determine that the folding process can actually become accelerated depending on the location of the hinge pin. If the hinge pin was positioned improperly, the lifting assembly would experience the undesirable slamming effect. To minimize this impact, the present inventors developed the clevis style inboard barrier mechanism 29, 29' discussed above. In particular, it was concluded that the pin location needed to be somewhere along the line between the top arm/tower hinge and the bottom arm/vertical channel hinge.

Figure 19:
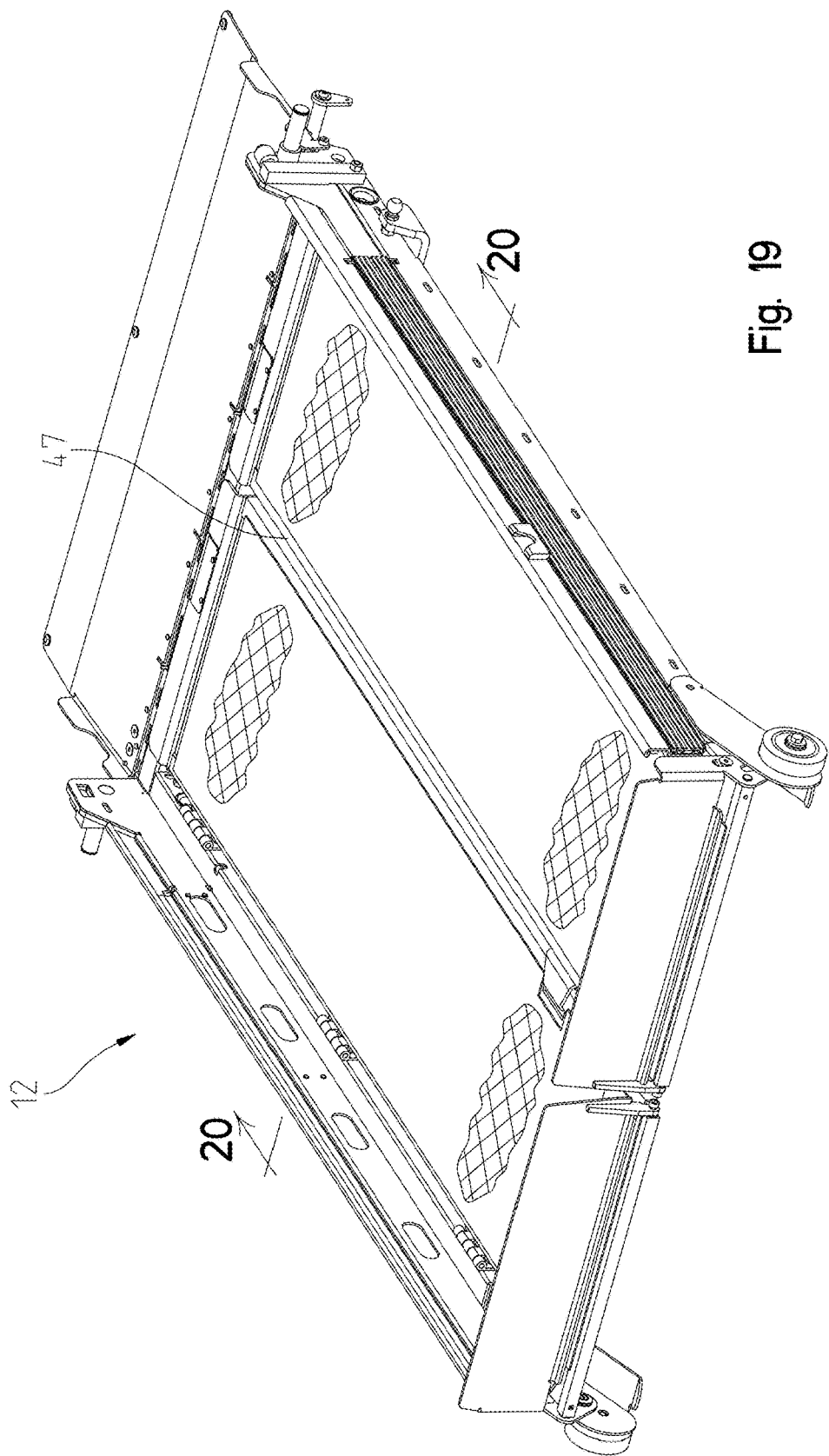
FIG. 19 represents a perspective view of a lift platform in accordance with one embodiment of the present invention.
Figure 20:
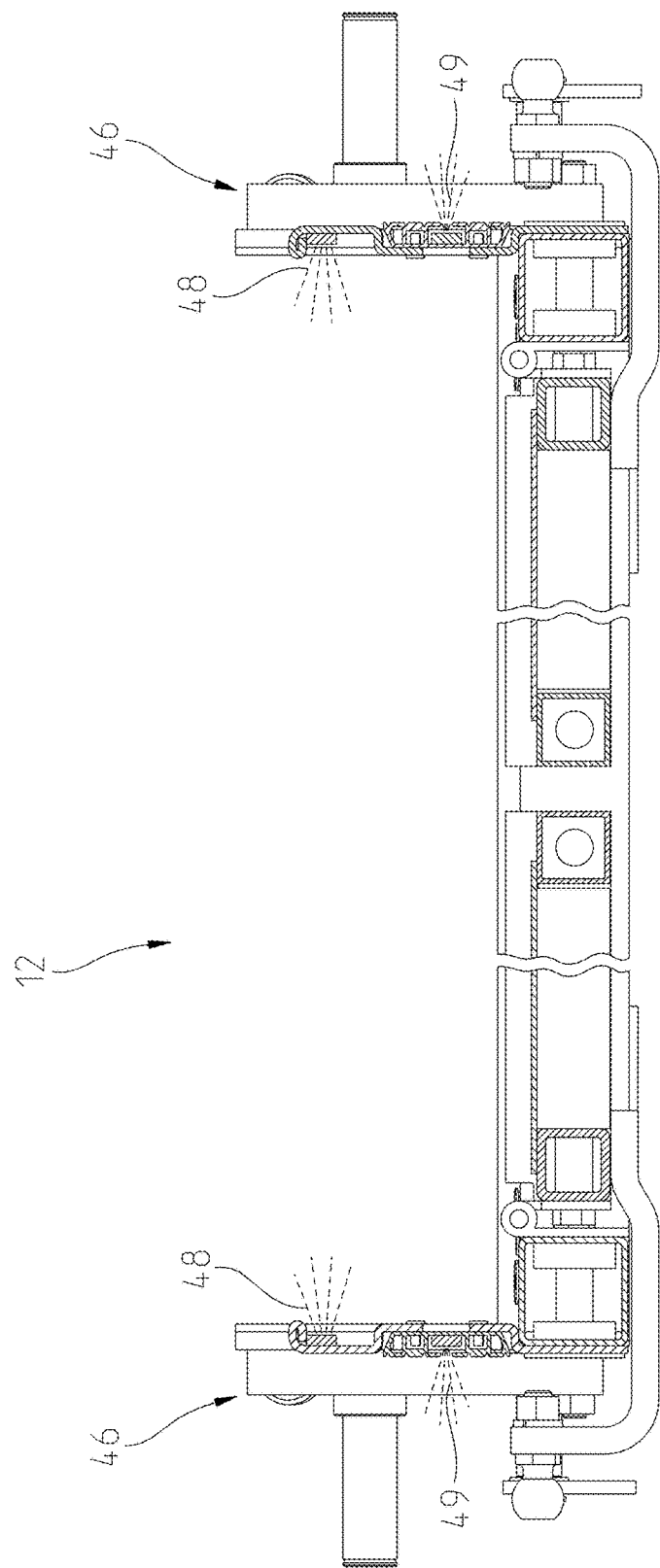
FIG. 20 represents a cross-sectional view of the lift platform taken along line 20-20 of FIG. 19.
Figure 21:
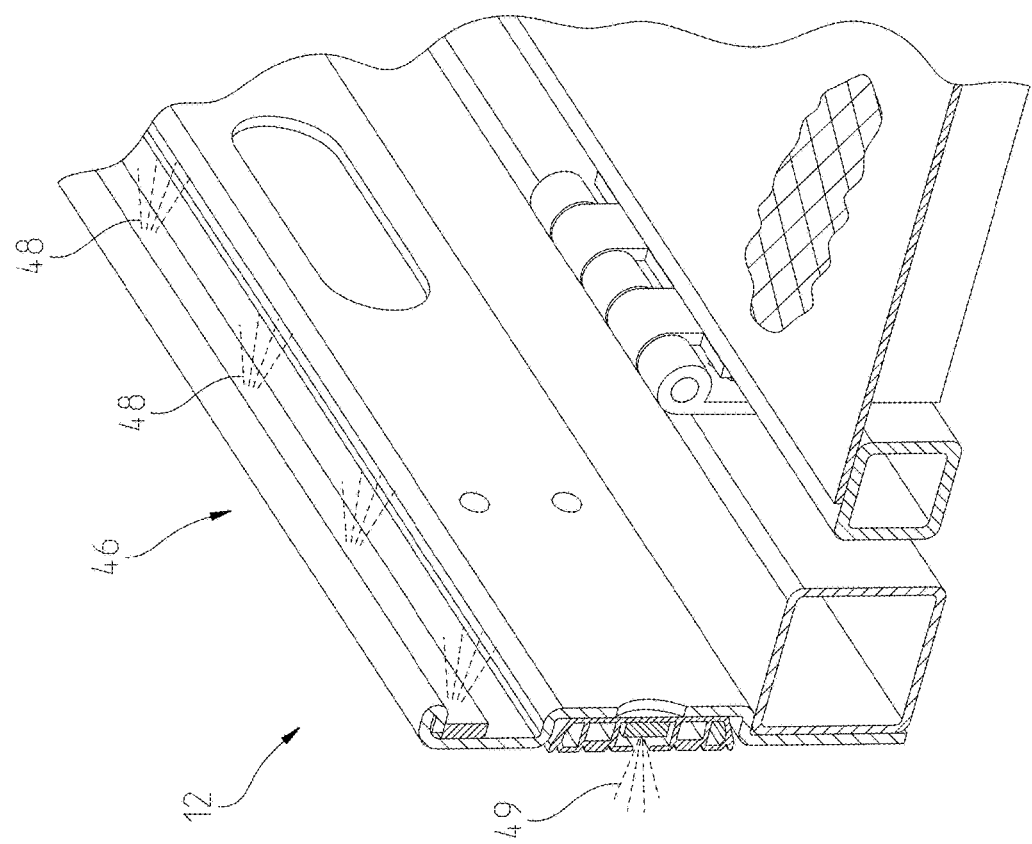
FIG. 21 represents a partial cross-sectional view of the lift platform of FIG. 19.
Figure 22:
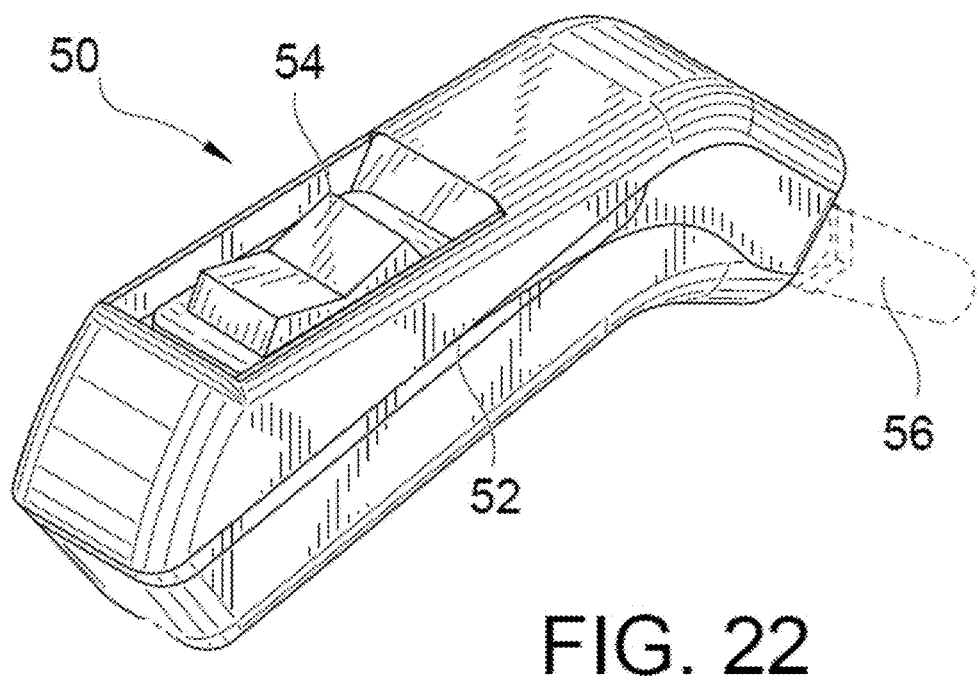
FIG. 22 represents a front perspective view of a vehicle lift platform hand switch that in accordance with one embodiment of the present invention.
Figure 23:
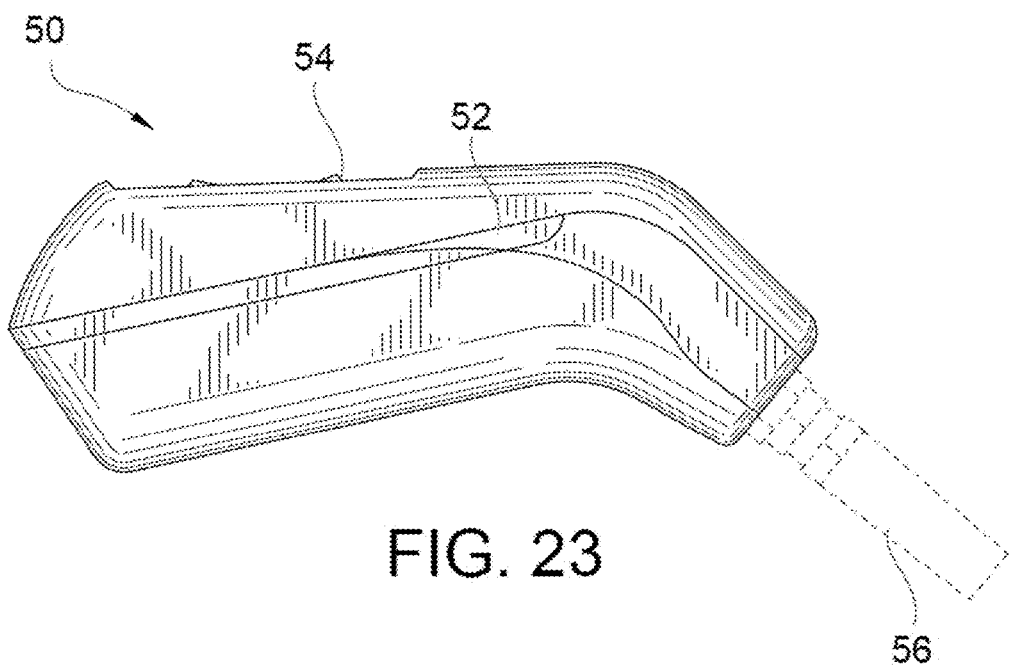
FIG. 23 is a left side view of the vehicle lift platform hand switch of FIG. 22.
Figure 24:
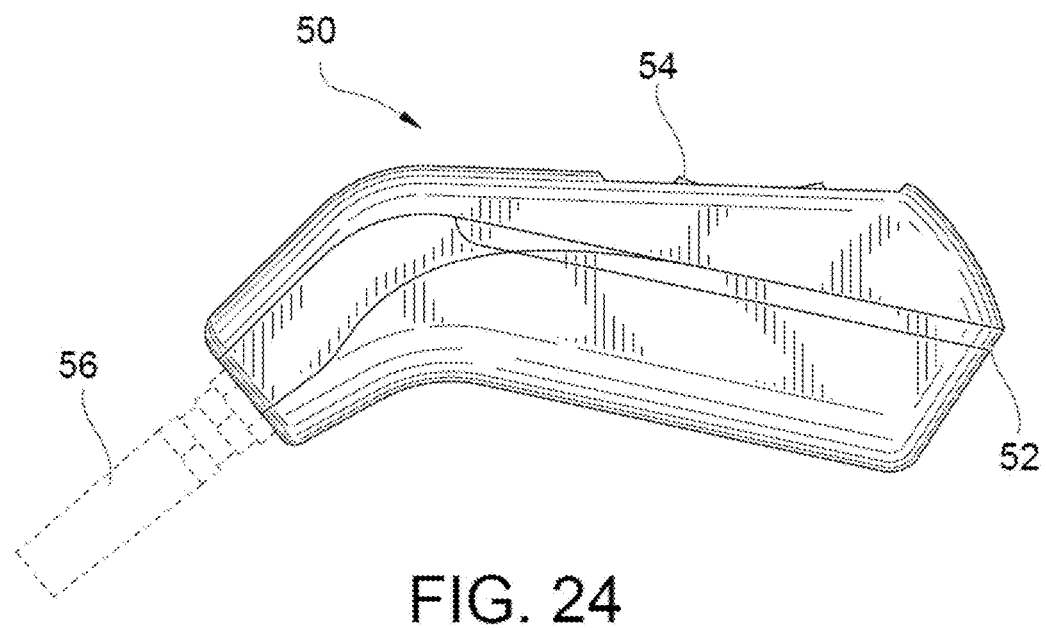
FIG. 24 is a right side view of the vehicle lift platform hand switch of FIG. 22.
Figure 25:
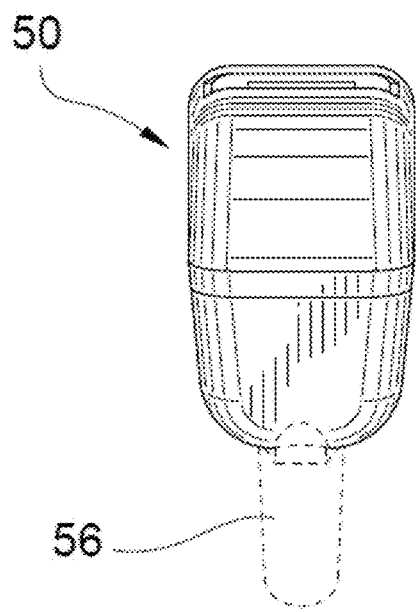
FIG. 25 is a front view of the vehicle lift platform hand switch of FIG. 22.
Figure 26:
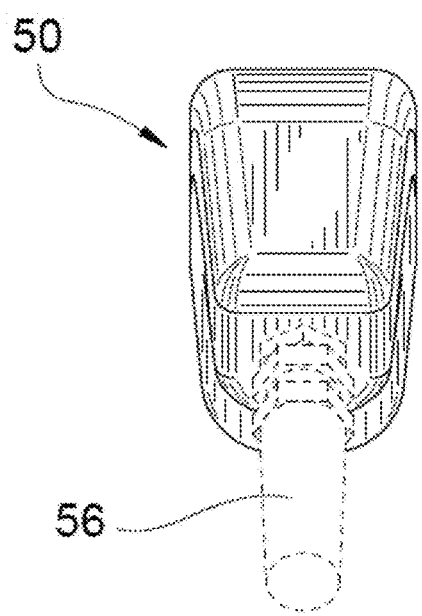
FIG. 26 is a rear view of the vehicle lift platform hand switch of FIG. 22.
Figure 27:
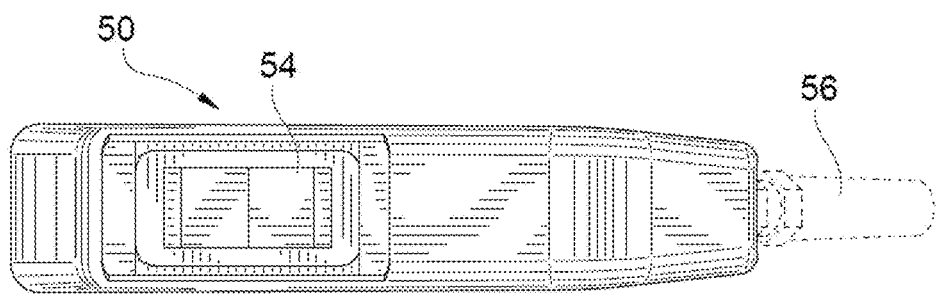
FIG. 27 is a top view of the vehicle lift platform hand switch of FIG. 22.
Figure 28:
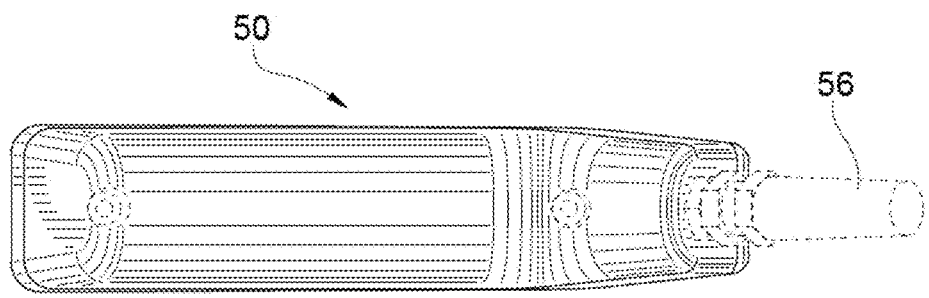
FIG. 28 is a bottom view of the vehicle lift platform hand switch of FIG. 22.

In accordance with certain embodiments herein, the wheelchair lift 10 includes barriers or platform side plates 46 that help to maintain a wheelchair on the wheelchair platform, thereby reducing the possibility of injury to the wheelchair occupant. As shown in FIGS. 19-21, to make the platform more visible during a loading operation, lights 48, 49 that will illuminate the platform 12 can be incorporated into the side plates 46. While those of skill in the art will understand and appreciate that any type of light can be utilized in accordance with the present teachings, in certain aspect, the lights can be either flashing or static LED lights. In addition, the lights can illuminate any color desired.

To better align the wheelchair occupant onto the lift platform 12 during the loading/unloading operation, in accordance with certain aspects herein, one or more visual indicators 47 can be incorporated into the platform. For instance, a painted stripe or strip of tape could be incorporated into the surface of the lift platform. In accordance with other illustrative embodiments, a ridge or other such elevated feature could also be etched into the surface of the lift platform.

As is shown in FIGS. 22-28, to move the platform 12 between the various positions described herein, in accordance with certain embodiments, a hand-held switch or pendant 50 can be associated with the vehicle lift 10. The operation of such hand-held switches is known within the art and therefore does not need to be discussed in great detail herein. It should be noted, however, that in accordance with certain aspects, the hand-held switch 50 can include a lighting element 52 positioned along at least a portion of its surface to indicate when the platform 12 is in motion. In other words, when a rocker switch/button 54 is activated by a user, the lighting element 52 will illuminate indicating that the lift is in motion. In another embodiment, the lighting element 52 may always be on when the vehicle lift 10 is not in the stowed position. In this embodiment, the lighting element 52 may only not be illuminated when the vehicle lift 10 is in the stowed position.

In addition to including a lighting element 52, the handheld switch 50 can also have a contoured and ergonomic shape that is designed to easily fit within a user's hand. In accordance with certain embodiments, the switch 50 can include an angled bottom that places the tension of the coiled cord 56 on the user's small finger, where the grip of the user naturally closes, thereby making the tension more comfortable. Also, the rocker switch/button 54, in accordance with certain exemplary embodiments, is angled upwards so that the user's thumb naturally sits at the center of the switch and has equal up/down motion to actuate the lift.

Finally, in accordance with certain aspects herein, raised ridges are spaced along the outer surface of the rocker switch so that if it bumps on the surface or edge of something (as when dropped), it prevents or reduces unintentional operation of the lift.

While an exemplary embodiment incorporating the principles of the present application has been disclosed hereinabove, the present application is not limited to the disclosed embodiments. Instead, this application is intended to cover any variations, uses, or adaptations of the application using its general principles. Further, this application is intended to cover such departures from the present disclosure as come within known or customary practice in the art to which this present application pertains and which fall within the limits of the appended claims.

The terminology used herein is for the purpose of describing particular illustrative embodiments only and is not intended to be limiting. As used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on", "engaged to", "connected to" or "coupled to" another element or layer, it may be directly on, engaged, connected or coupled to the other element or layer, or intervening elements or layers may be present. In contrast, when an element is referred to as being "directly on," "directly engaged to", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath", "below", "lower", "above", "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations).

The invention claimed is:

1. A lift for transferring a user to and from a vehicle, comprising:
   a lift platform for receiving the user, the lift platform being arcuately movable between a first position and a second position;
   a vertical arm coupled to the lift platform, the vertical arm having a profile that is progressively convex along the entire length of the vertical arm; and
   a pair of parallel arms extending from the vertical arm and pivotally coupled to a bracket mounted to the vehicle, wherein one of the parallel arms has a U-shaped cross-section and the other of the parallel arms has a rectangular-shaped cross-section that is defined by top and bottom parallel surfaces connected by first and second parallel side surfaces;
   wherein the vertical arm has a generally U-shaped cross-section that forms a channel configured to receive at least a portion of the pair of parallel arms.

2. The lift of claim 1, further comprising a barrier connected to the lift platform, the barrier being configured to pivotally move in coordination with the lift platform as the lift platform moves between the first and second positions.

3. The lift of claim 2, further comprising a linkage mechanism configured to actuate the lift platform and the barrier.

4. The lift of claim 3, wherein the linkage mechanism comprises a pivoting elbow member that is configured to at least partially contact an outer surface of one of the pair of parallel arms as the lift platform moves between the first and second positions.

5. The lift of claim 2, further comprising a second barrier pivotally connected to the lift platform, wherein the second barrier is parallel to the first barrier.

6. The lift of claim 1, wherein the lift platform further includes a pair of parallel side plates.

7. The lift of claim 6, wherein at least one of the pair of parallel side plates includes a light source that is configured to illuminate a portion of the lift platform.

8. The lift of claim 1, further comprising a switch for actuating the lift platform between the first and second positions.

9. The lift of claim 8, further comprising a control assembly in communication with the switch, the control assembly being configured to move the lift platform between the first and second positions in response to a user activating the switch.

10. The lift of claim 1, further comprising a foldable handrail that extends through an opening of the vertical arm.

11. The lift of claim 1, further comprising a hydraulic cylinder diagonally disposed between the pair of parallel arms.

12. A lift for transferring a user to and from a vehicle, comprising:
 a lift platform for receiving the user; and
 a pair of lifting assemblies configured to arcuately move the lift platform between a first position and a second position, the lifting assemblies each having a first arm coupled to the lift platform and a pair of parallel arms pivotally connected to the first arm, wherein one of the parallel arms has a U-shaped cross-section and the other of the parallel arms has a rectangular-shaped cross-section that is defined by top and bottom parallel surfaces connected by first and second parallel side surfaces; and
 wherein the first arm has a profile that is progressively convex along its entire length and a generally U-shaped cross-section that forms a channel configured to receive at least a portion of the pair of parallel arms.

13. The lift of claim 12, further comprising a bracket mounted to the vehicle, wherein each of the pair of parallel arms is pivotally coupled to the bracket.

14. The lift of claim 12, further comprising a barrier connected to the lift platform, the barrier being configured to pivotally move in coordination with the lift platform as the lift platform moves between the first and second positions.

15. The lift of claim 14, further comprising a linkage mechanism configured to actuate the lift platform and the barrier.

16. The lift of claim 15, wherein the linkage mechanism comprises a pivoting elbow member that is configured to at least partially contact an outer surface of one of the pair of parallel arms as the lift platform moves between the first and second positions.

17. The lift of claim 14, further comprising a second barrier pivotally connected to the lift platform, wherein the second barrier is parallel to the first barrier.

18. The lift of claim 12, further comprising a hydraulic cylinder diagonally disposed between the pair of parallel arms.

19. The lift of claim 12, wherein the lift platform further includes a pair of parallel side plates.

20. The lift of claim 19, wherein at least one of the pair of parallel side plates includes a light source that is configured to illuminate a portion of the lift platform.

21. The lift of claim 12, further comprising a switch for actuating the lift platform between the first and second positions.

22. The lift of claim 21, further comprising a control assembly in communication with the switch, the control assembly being configured to move the lift platform between the first and second positions in response to a user activating the switch.

23. The lift of claim 12, further comprising a foldable handrail that extends through an opening of the vertical arm.

* * * * *